United States Patent
Grubb et al.

(10) Patent No.: US 7,149,433 B2
(45) Date of Patent: Dec. 12, 2006

(54) UPGRADE OF OPTICAL AMPLIFIER SITE TO A DIGITAL OPTICAL NETWORK SITE IN AN OPTICAL TRANSMISSION NETWORK

(75) Inventors: Stephen G. Grubb, Ellicott City, MD (US); Matthew L. Mitchell, Bethesda, MD (US); Robert B. Taylor, Windsor Mill, MD (US); Vincent G. Dominic, Fremont, CA (US); Alan C. Nilsson, Mountain View, CA (US)

(73) Assignee: Infineria Corporation, Sunnyvale, CA (US)

( * ) Notice: Subject to any disclaimer, the term of this patent is extended or adjusted under 35 U.S.C. 154(b) by 595 days.

(21) Appl. No.: 10/267,274

(22) Filed: Oct. 8, 2002

(65) Prior Publication Data

US 2004/0001248 A1    Jan. 1, 2004

Related U.S. Application Data

(60) Provisional application No. 60/392,494, filed on Jun. 28, 2002.

(51) Int. Cl.
*H04B 10/00*    (2006.01)
(52) U.S. Cl. .................. 398/175; 398/180; 398/97
(58) Field of Classification Search ............... 398/175, 398/180, 160, 82, 97, 83, 49, 45, 141; 385/14
See application file for complete search history.

(56) References Cited

U.S. PATENT DOCUMENTS

| | | | |
|---|---|---|---|
| 4,090,067 A | 5/1978 | Bell, III et al. | 250/199 |
| 4,461,543 A * | 7/1984 | McMahon | 359/320 |
| 4,688,260 A | 8/1987 | Shutterly et al. | 350/96.16 |
| 4,747,650 A * | 5/1988 | Sakuda | 385/27 |
| 4,948,218 A | 8/1990 | Kobayashi et al. | 350/96.16 |
| 5,914,794 A | 6/1999 | Fee et al. | 359/110 |
| 6,169,616 B1 | 1/2001 | Cao | 359/130 |
| 6,335,819 B1 | 1/2002 | Cho et al. | 359/333 |
| 6,445,851 B1 * | 9/2002 | Rakuljic et al. | 385/37 |
| 6,594,409 B1 * | 7/2003 | Dutt et al. | 385/14 |
| 6,661,946 B1 * | 12/2003 | Caroli et al. | 385/24 |
| 6,690,846 B1 * | 2/2004 | Zhou et al. | 385/15 |
| 6,782,156 B1 * | 8/2004 | Noirie et al. | 385/24 |
| 6,882,466 B1 * | 4/2005 | Shimojoh et al. | 359/334 |
| 2002/0015201 A1 | 2/2002 | Zhou et al. | 359/124 |
| 2002/0030867 A1 | 3/2002 | Iannone et al. | 359/124 |
| 2002/0109908 A1 | 8/2002 | Koteles et al. | 359/337.1 |

(Continued)

FOREIGN PATENT DOCUMENTS

EP    1030471 A1 *    8/2000

*Primary Examiner*—Agustin Bello
*Assistant Examiner*—Quan-Zhen Wang
(74) *Attorney, Agent, or Firm*—W. Douglas Carothers, Jr.

(57) ABSTRACT

A digital signal channel bypass is provided as bypass around an optical network optical amplifier, in particular, an analog type optical amplifier, such as an EDFA, in an optical transport network or system. The digital signal bypass provides for an ability to maintain the existing optical amplifier OO amplification site while inserting a bypass that provides ultra low-cost OEO REGEN in a digital optical network (DON) utilizing both semiconductor electronic integrated circuit chips and semiconductor photonic integrated circuit (PIC) chips where all the optical components are in semiconductor integrated chip form providing 1R, 2R, 3R or 4R regeneration as well as other signal caring functionality. A salient feature of the digital signal bypass is to regenerate signals in the optical span that are outside the gain bandwidth of the EDFA or other such amplifier.

24 Claims, 15 Drawing Sheets

U.S. PATENT DOCUMENTS

2002/0126712 A1* 9/2002 Mueller ..................... 370/537

2002/0171890 A1* 11/2002 Lin et al. .................... 359/124

* cited by examiner

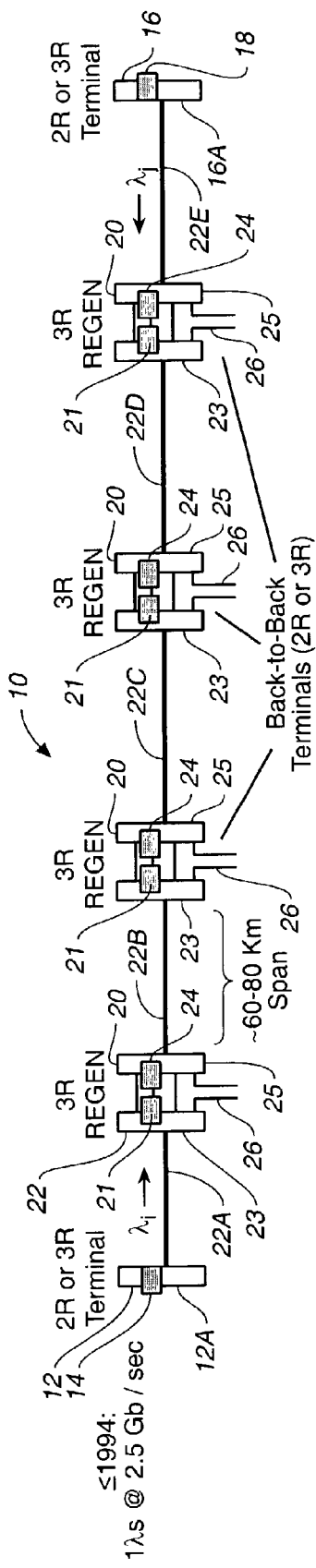
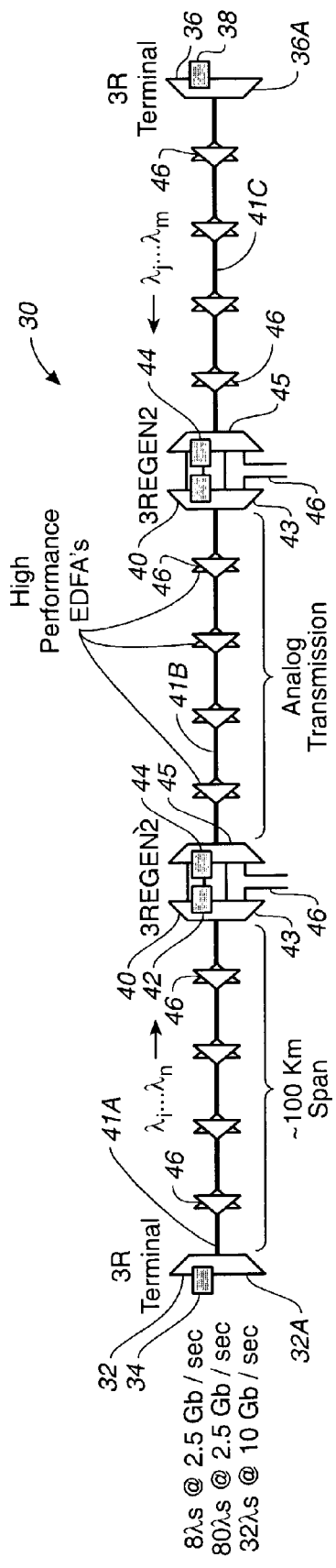

FIG._3A
(PRIOR ART)
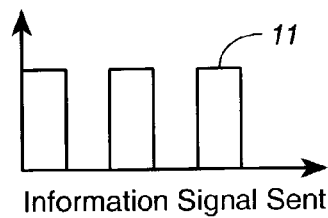
Information Signal Sent
FIG._3B
(PRIOR ART)
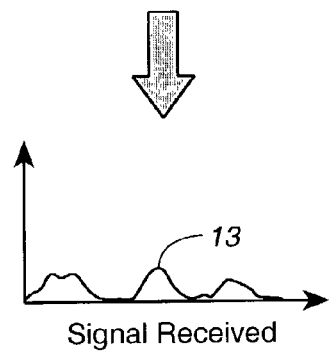
Signal Received
FIG._3C
(PRIOR ART)
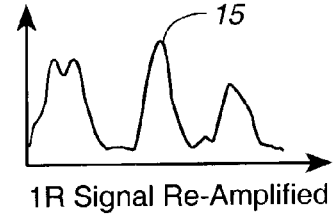
1R Signal Re-Amplified
FIG._3D
(PRIOR ART)
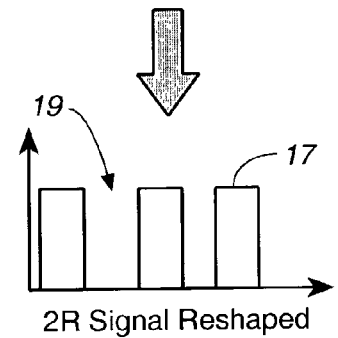
2R Signal Reshaped
FIG._3E
(PRIOR ART)
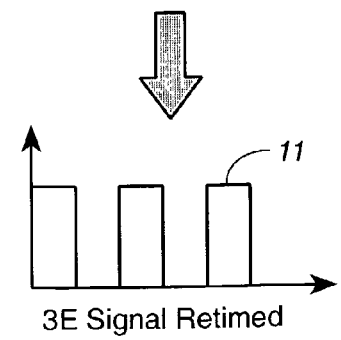
3E Signal Retimed

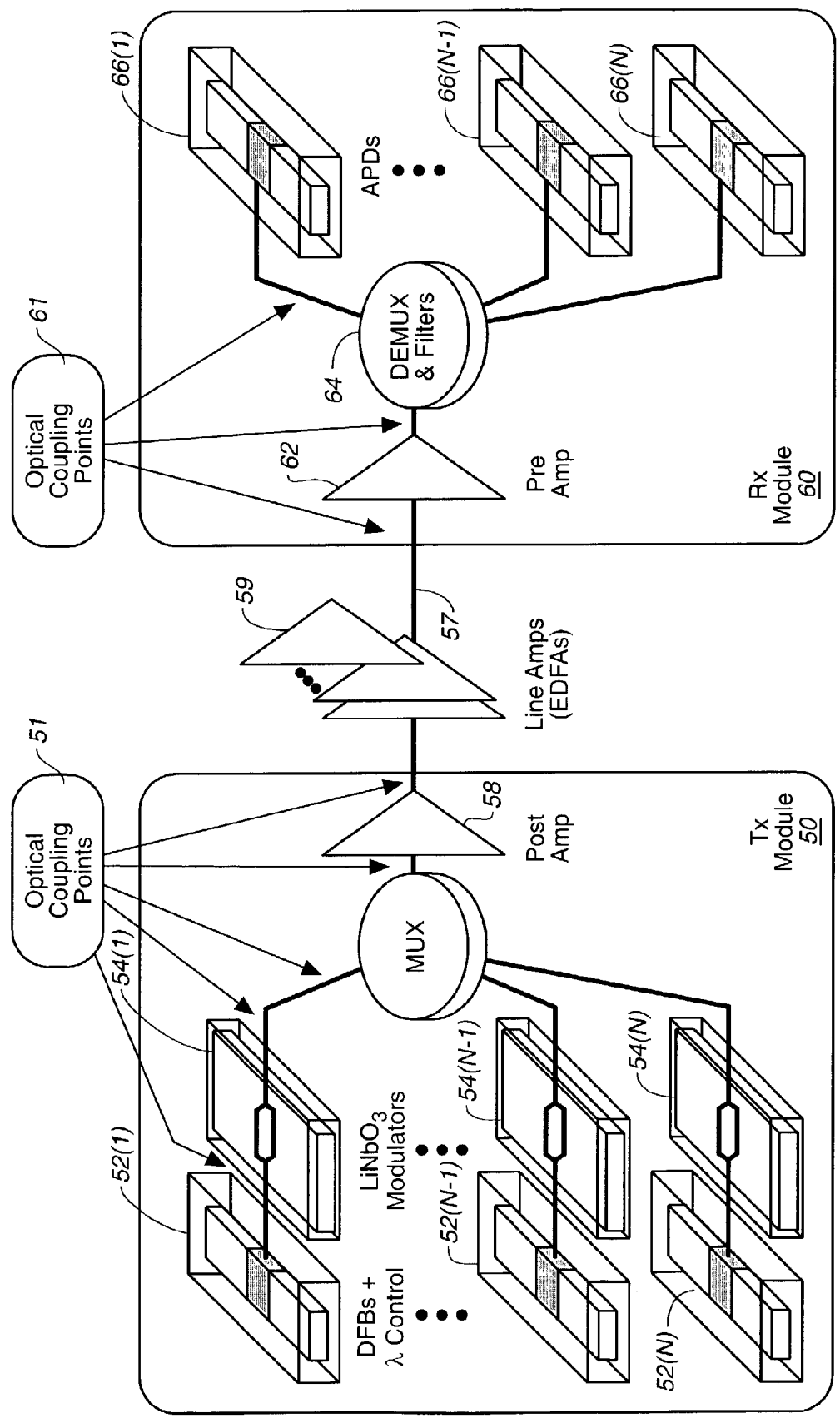
FIG._4 *(PRIOR ART)*

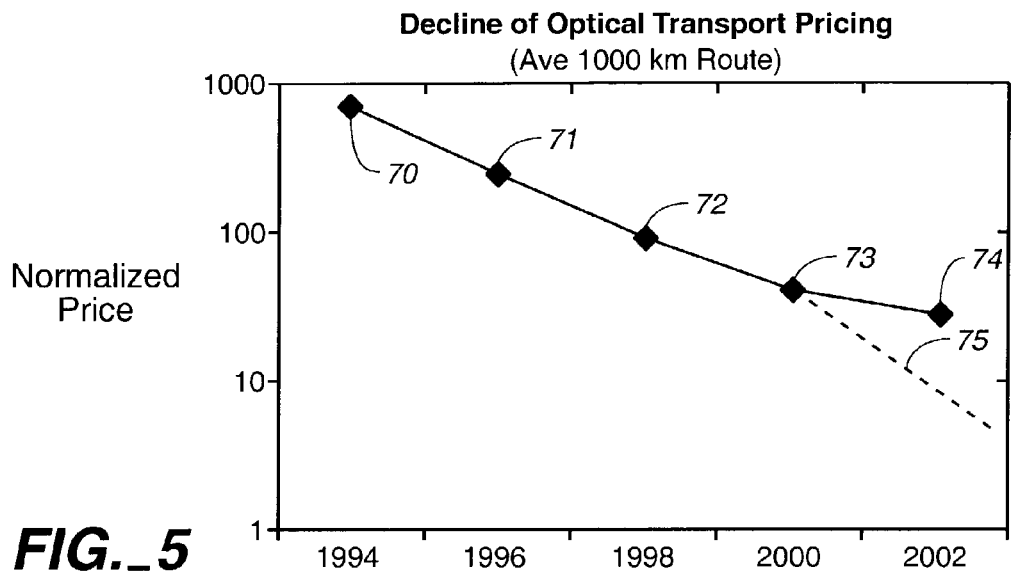
FIG._5
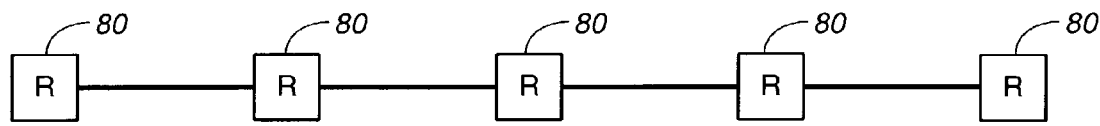
FIG._6A
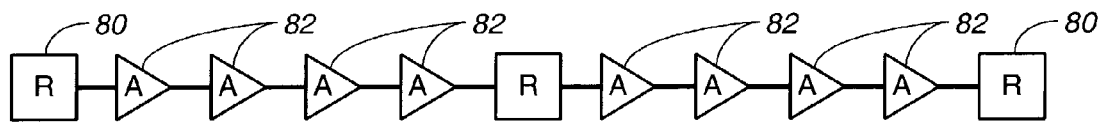
FIG._6B
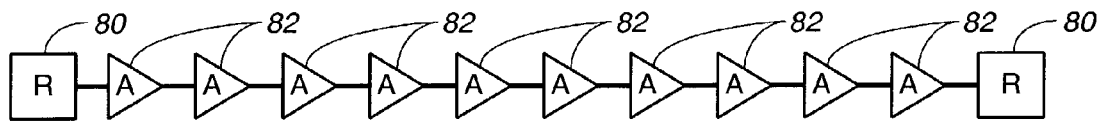
FIG._6C
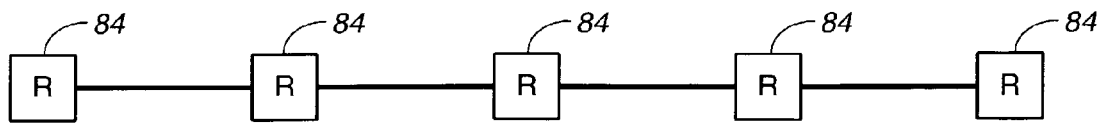
FIG._6D

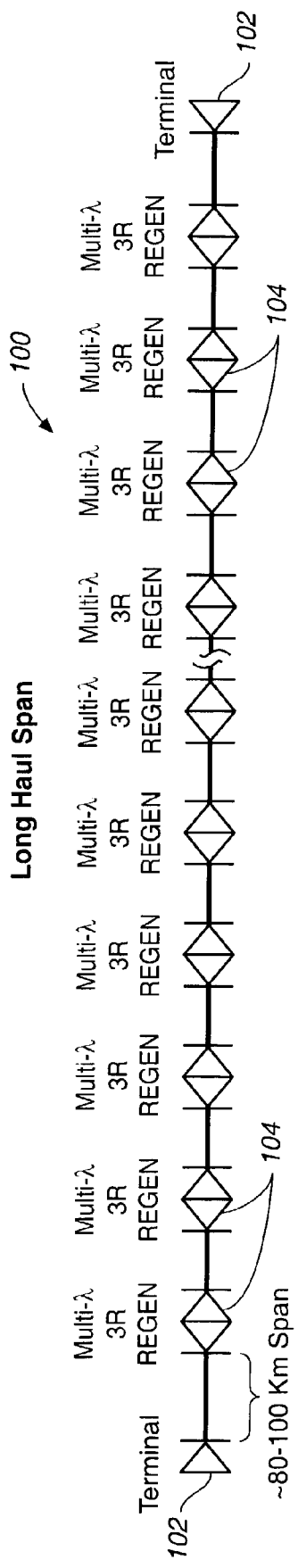
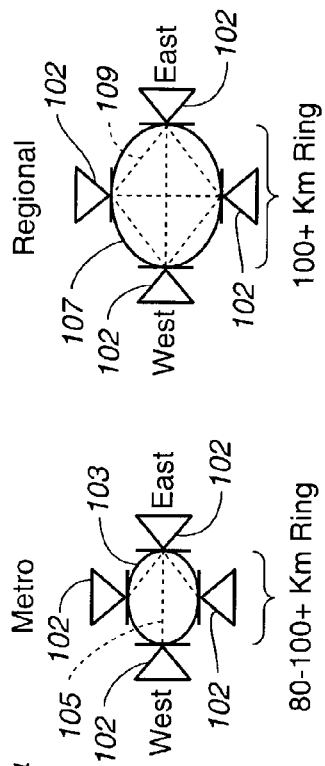
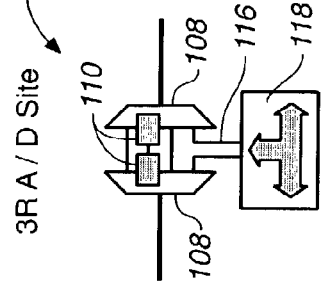
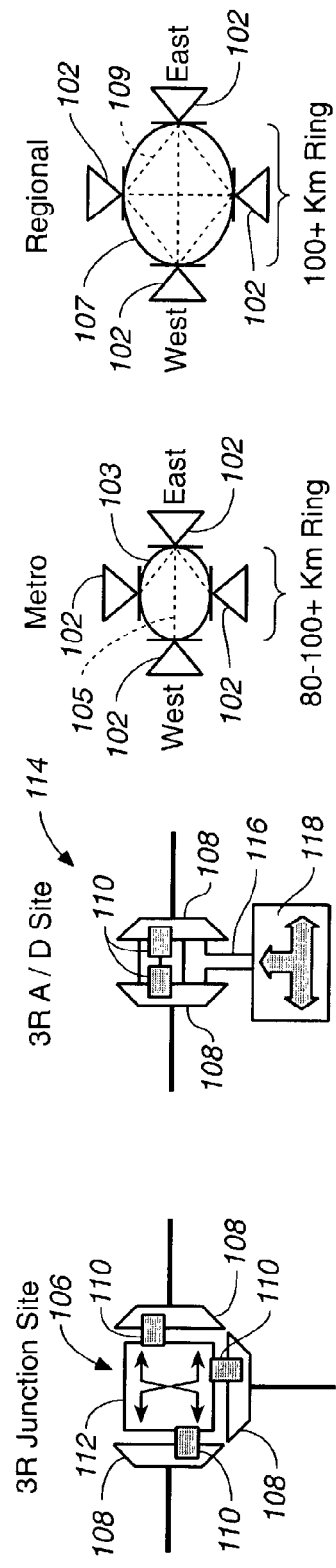
FIG._7
FIG._8
FIG._9
FIG._10
FIG._11

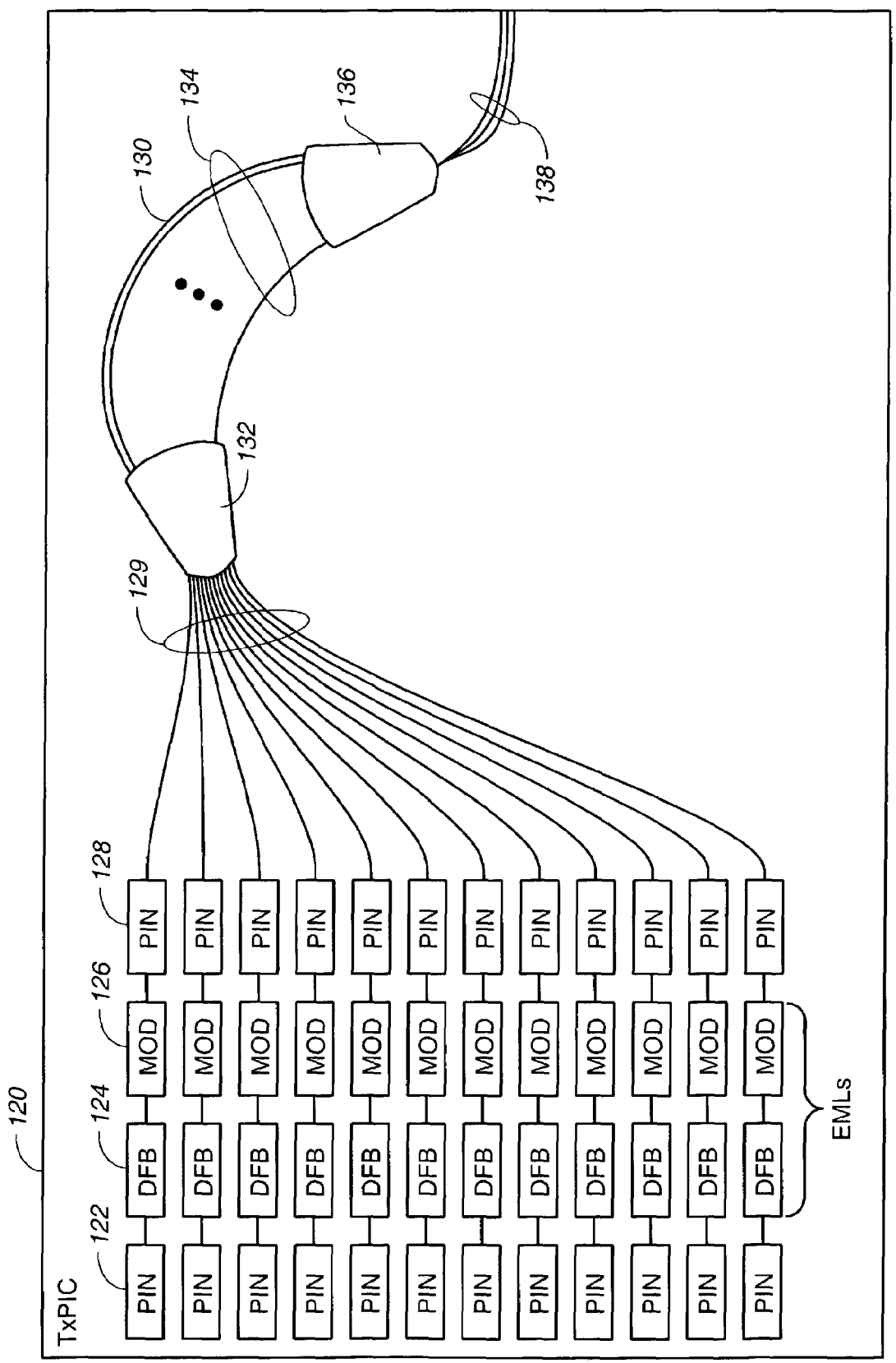
FIG._12

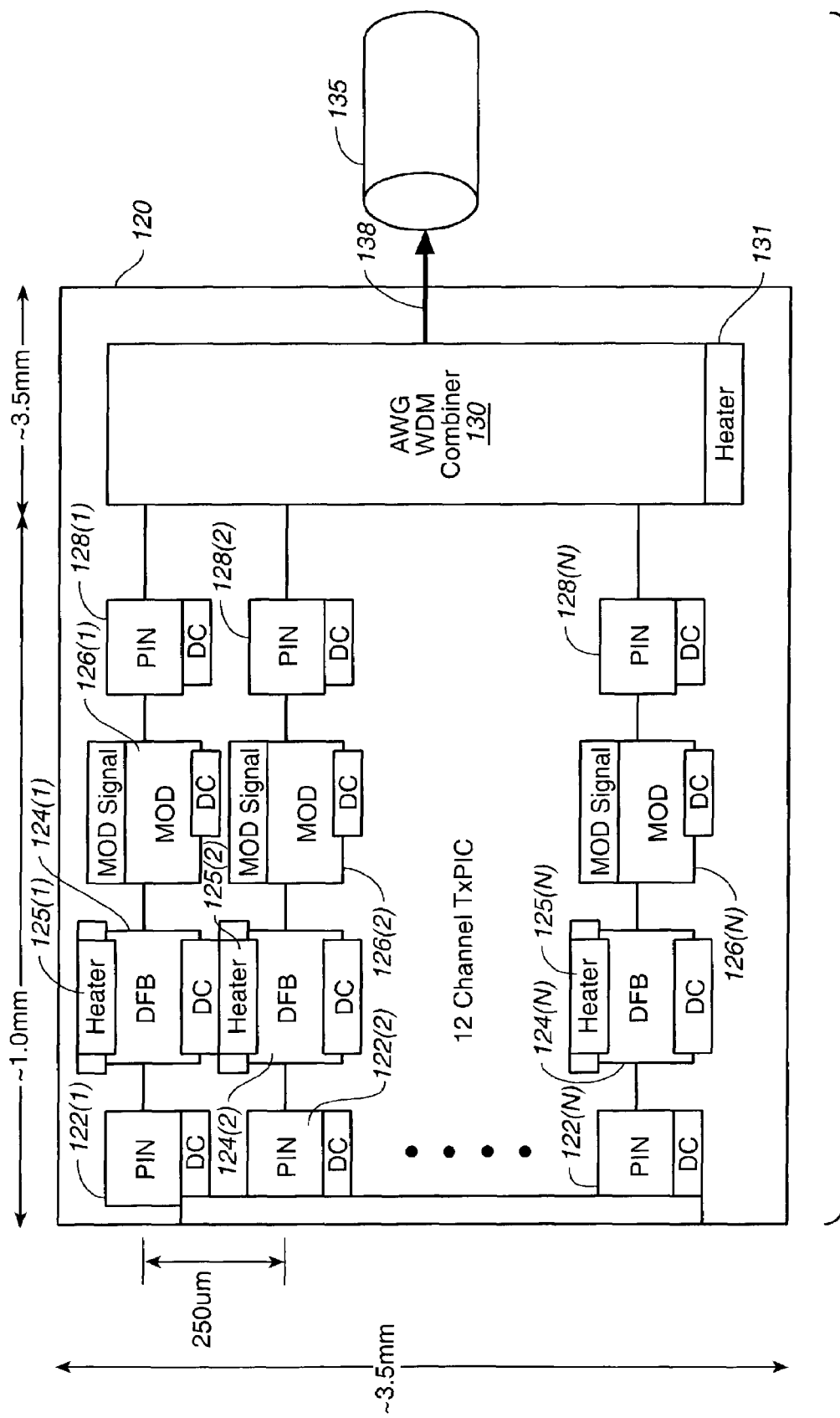
FIG._13

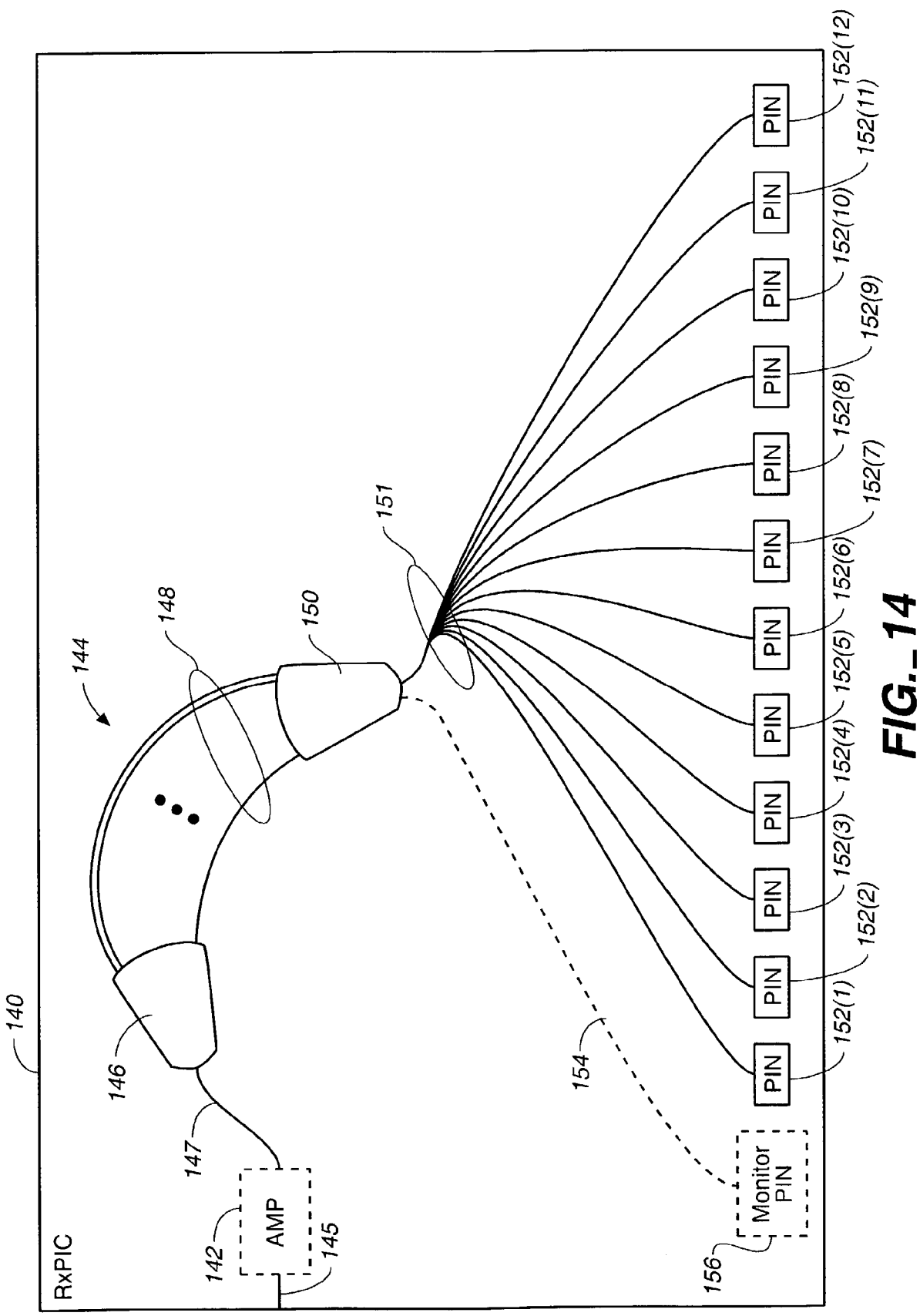
FIG._14

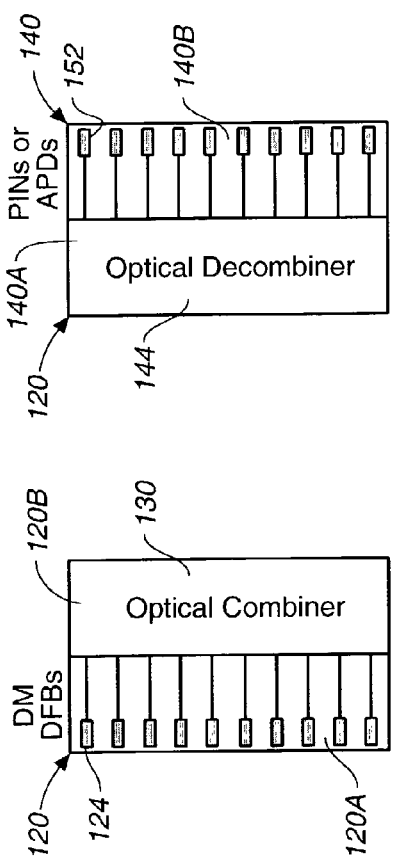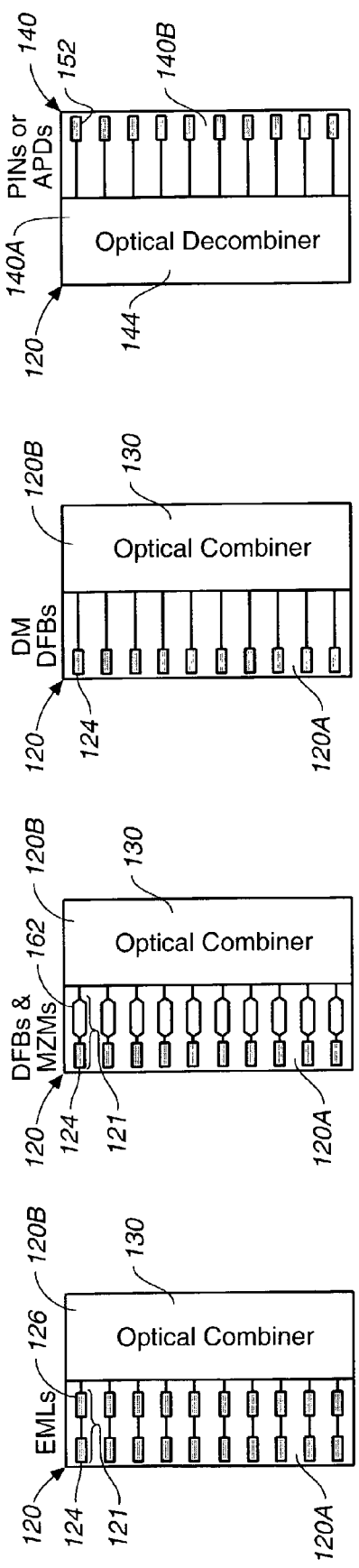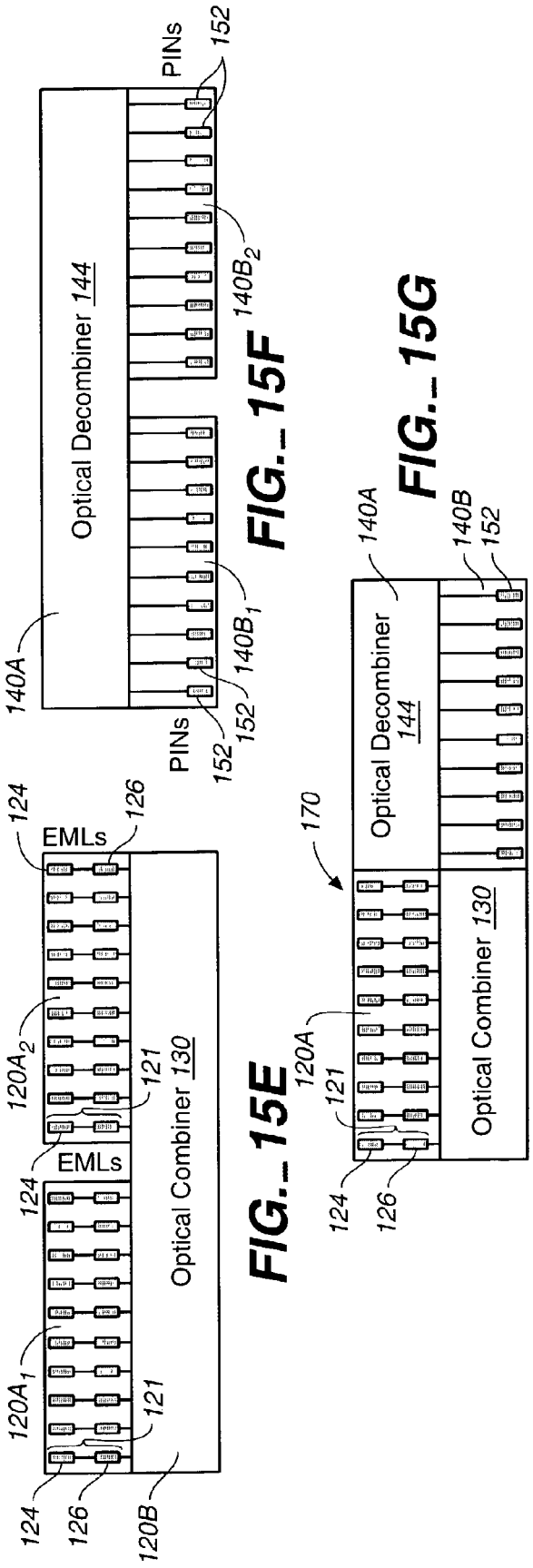
FIG._15A  FIG._15B  FIG._15C  FIG._15D  FIG._15E  FIG._15F  FIG._15G

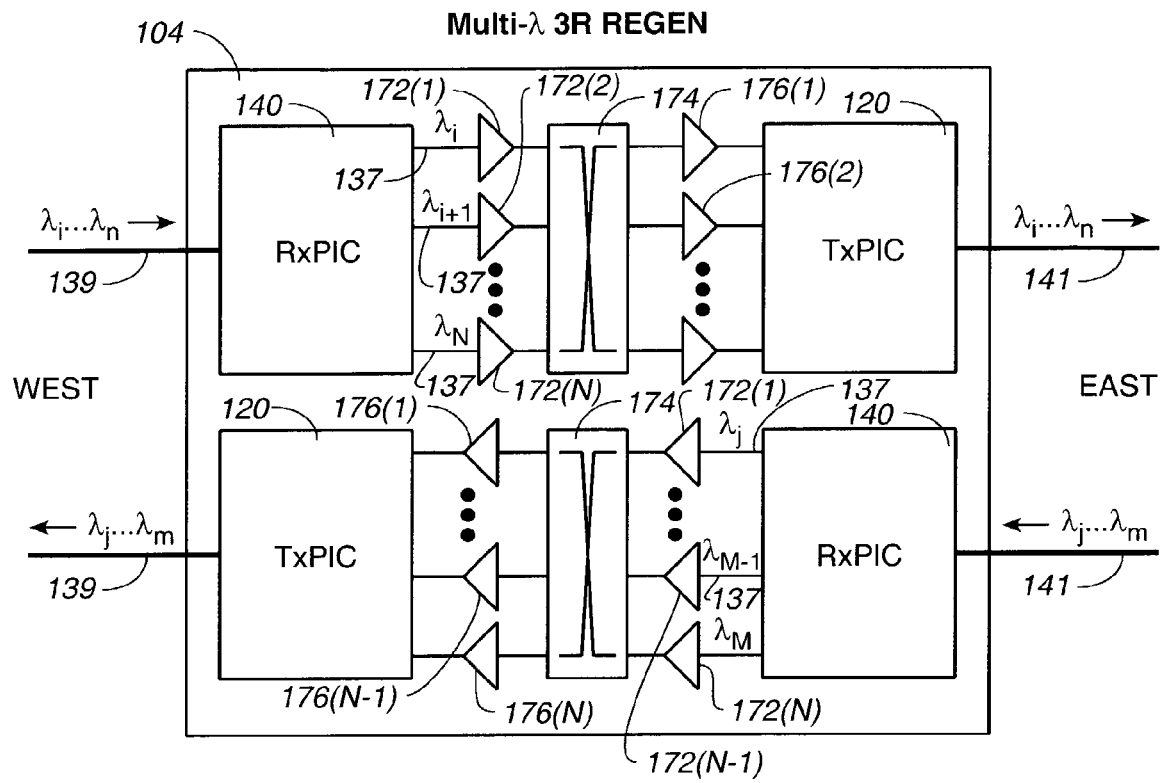
FIG._16
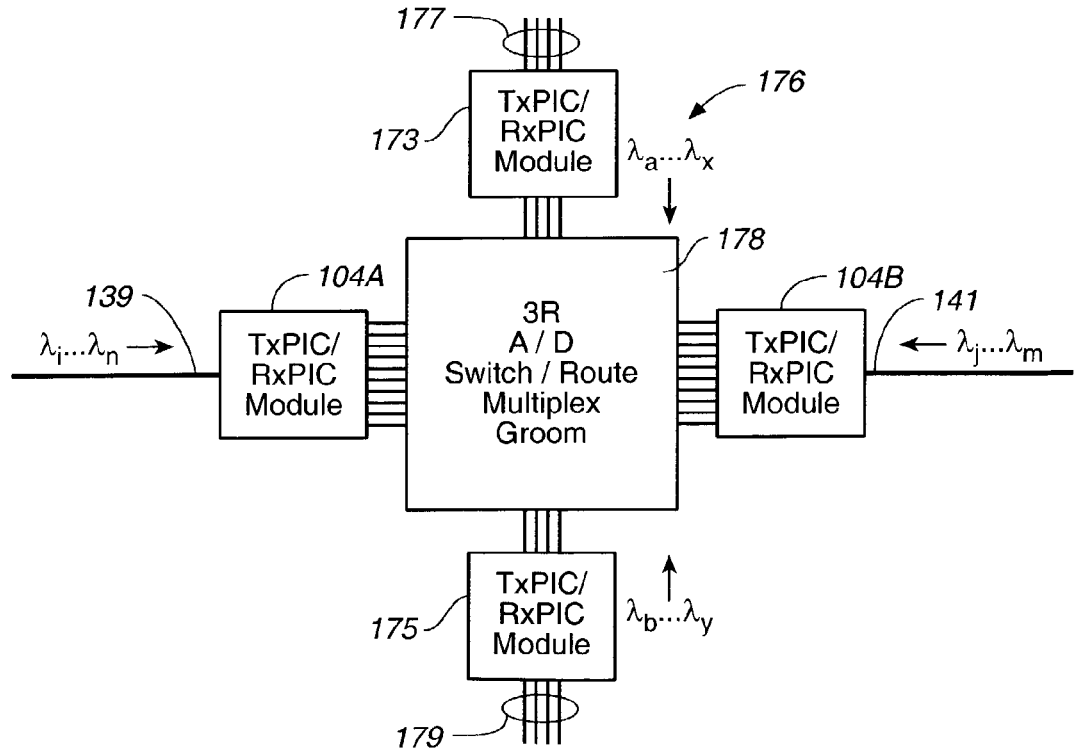
FIG._17

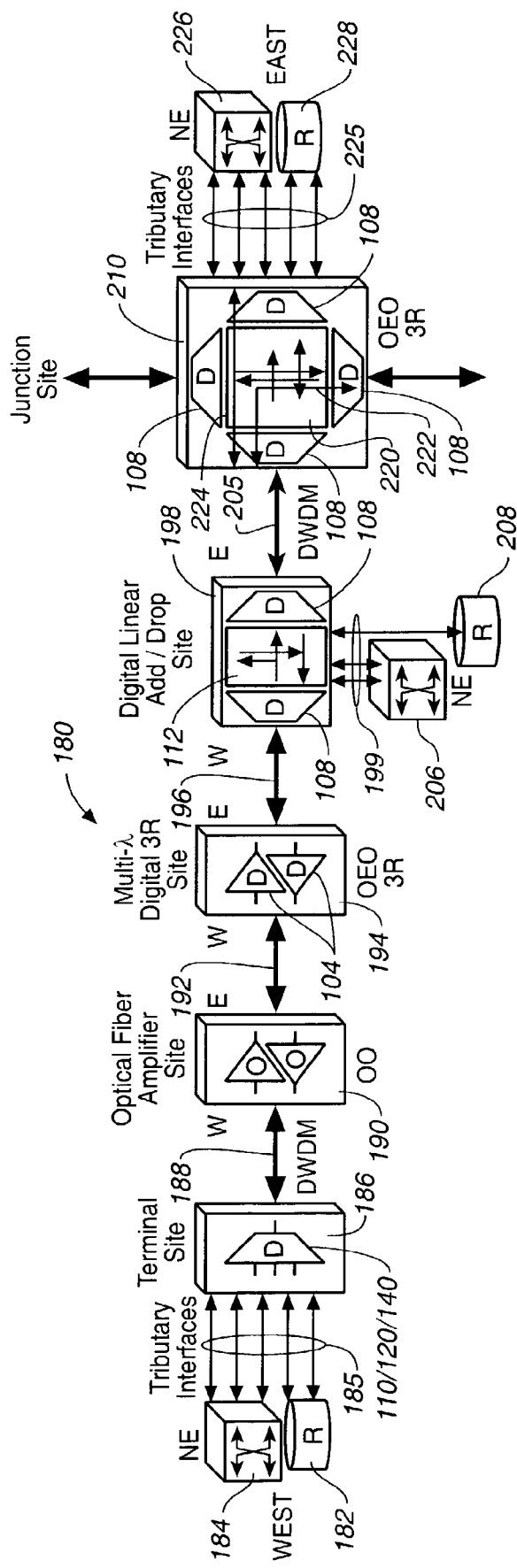
FIG._18

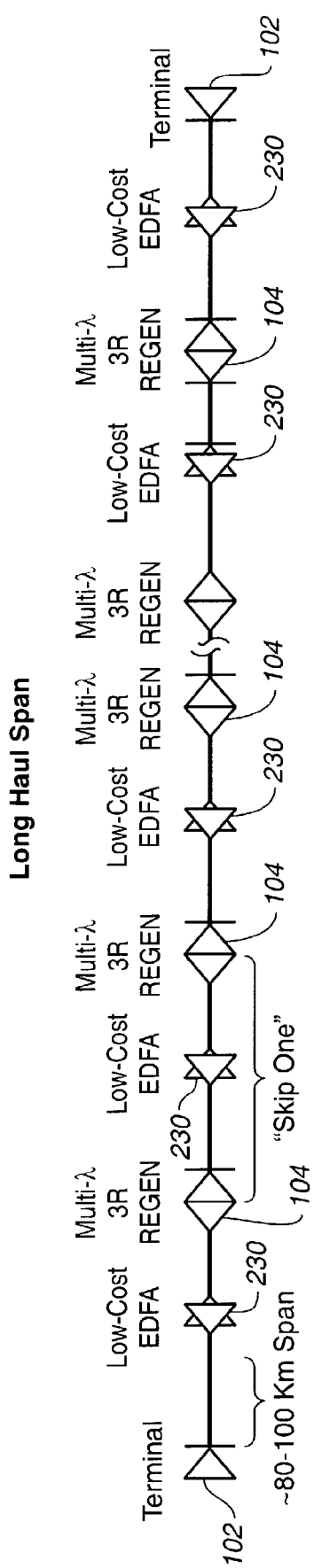
FIG._19
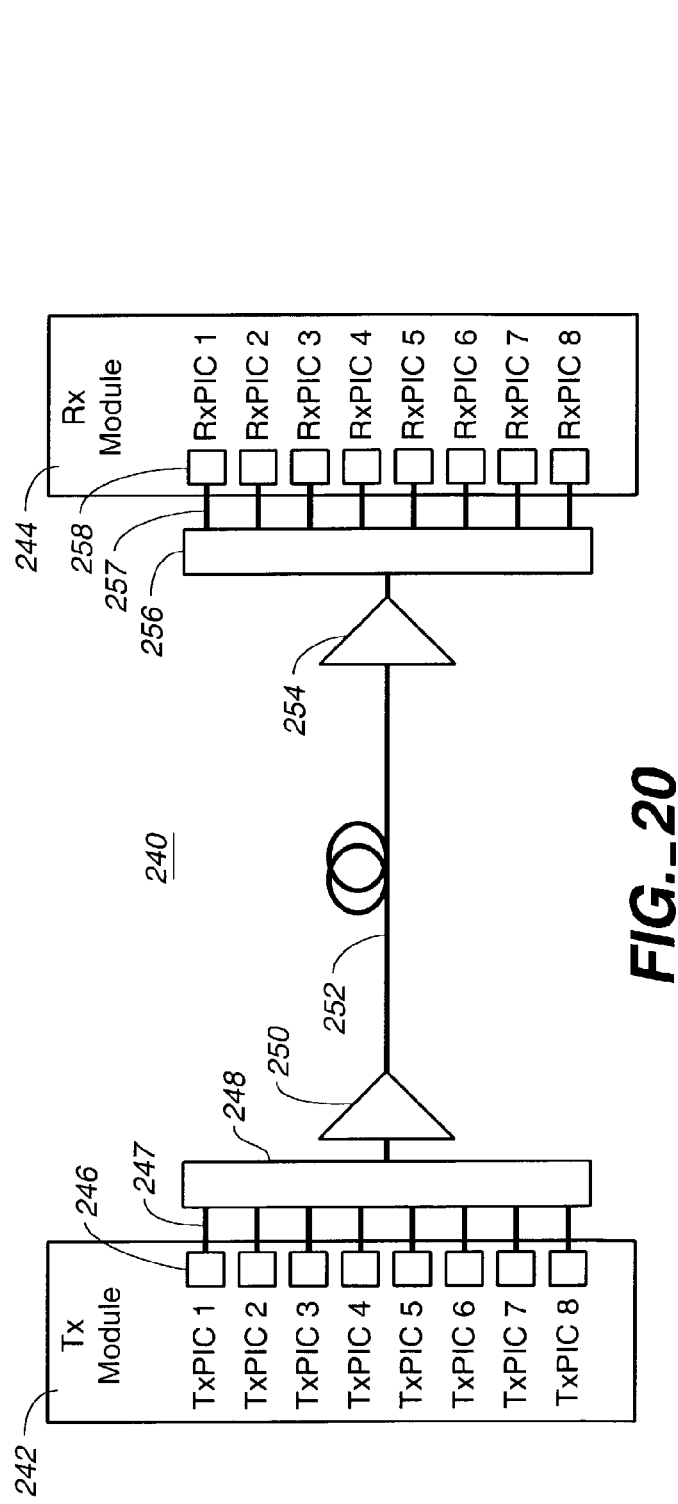
FIG._20

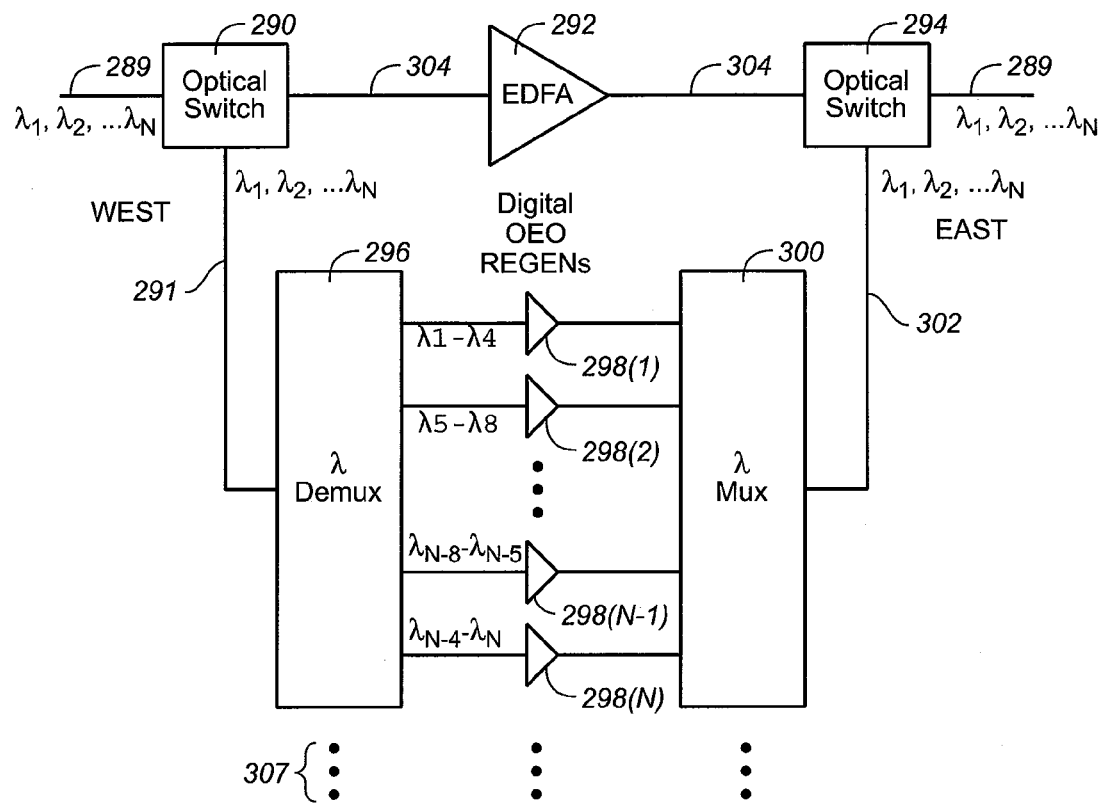
FIG._21
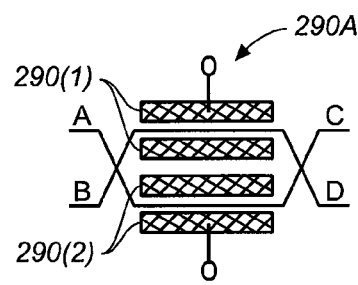
FIG._21A

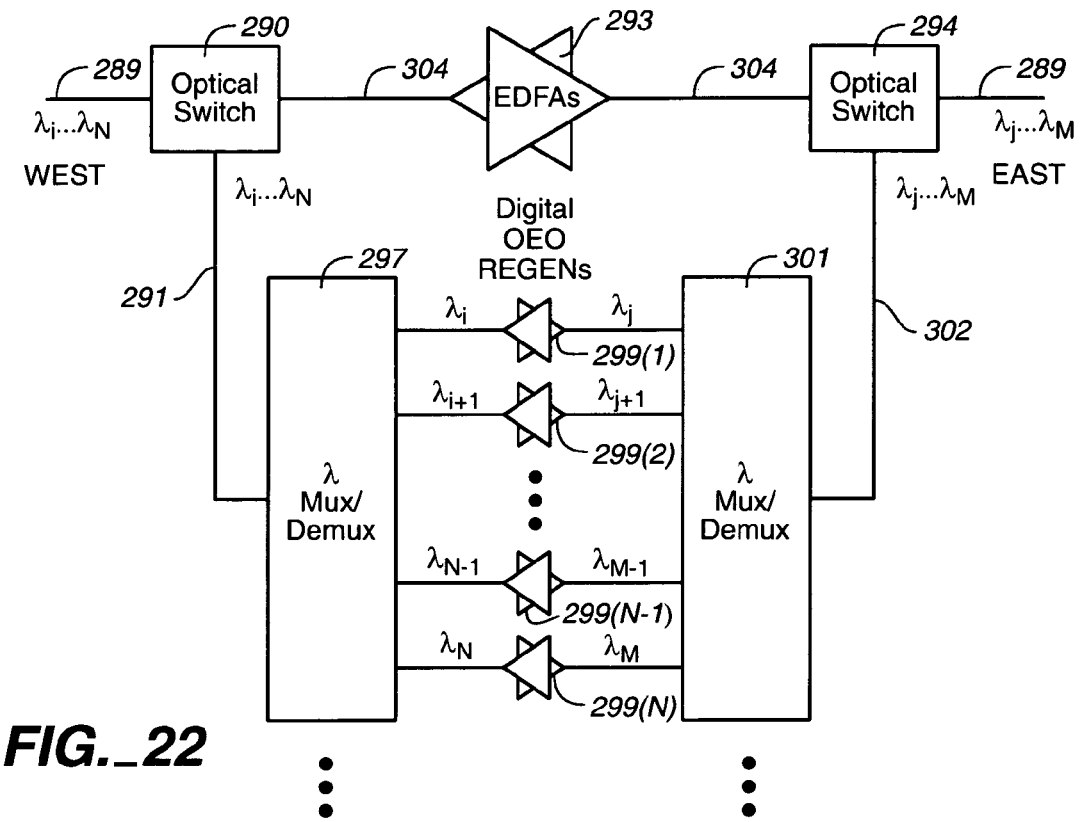
FIG._22
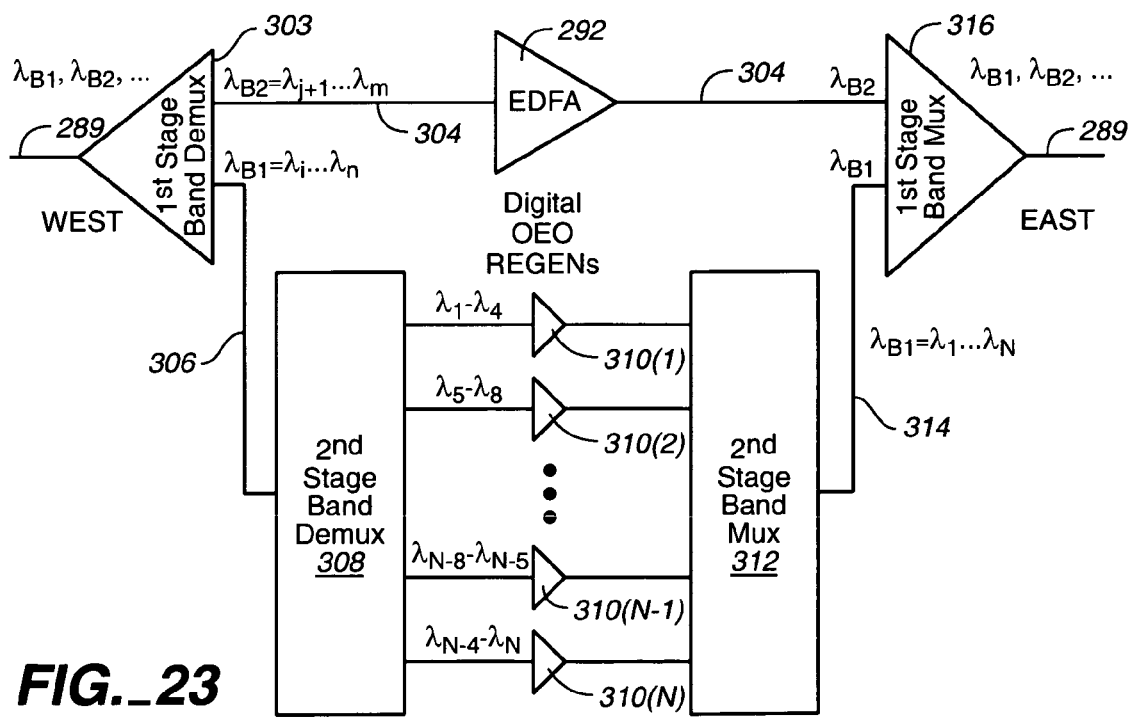
FIG._23

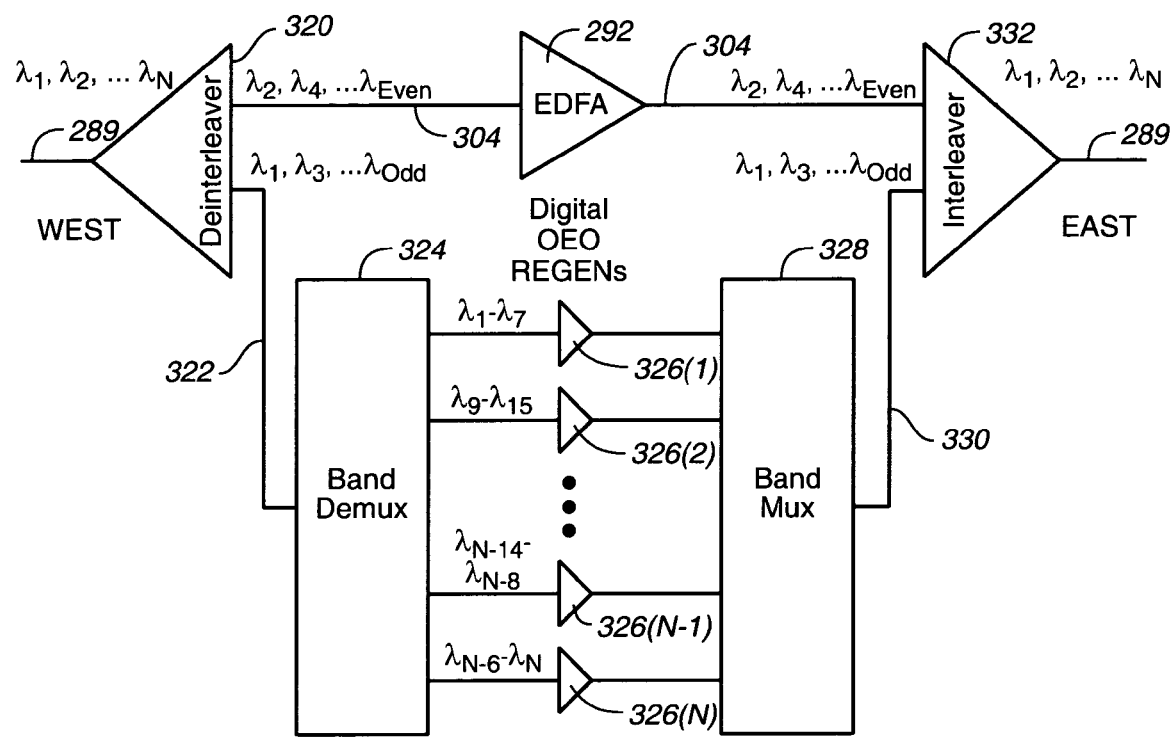
FIG._24

UPGRADE OF OPTICAL AMPLIFIER SITE TO A DIGITAL OPTICAL NETWORK SITE IN AN OPTICAL TRANSMISSION NETWORK

CROSS REFERENCE TO RELATED APPLICATIONS

This application claims priority to provisional application Ser. No. 60/392,494 filed Jun. 28, 2002 and entitled, DIGITAL OPTICAL NETWORK ARCHITECTURE, now non-provisional application Ser. No. 10/267,212, filed Oct. 8, 2002, also published on May 29, 2003 as Pub. No. US 2003/0099018 A1; which applications are incorporated herein by their reference.

BACKGROUND OF THE INVENTION

1. Field of the Invention

This invention relates generally to optical transport networks and more particularly to an upgrade of analog optical amplifier sites or nodes in optical transport networks through the deployment of a bypass analog amplifier site or node with a digital amplifier site or node comprising low cost, compact optical-electrical-optical (OEO) regeneration (REGEN) module.

2. Description of the Related Art

If used throughout this description and the drawings, the following short terms have the following meanings unless otherwise stated:

1R—Re-amplification of the information signal.

2R—Optical signal regeneration that includes signal reshaping as well as signal regeneration or re-amplification.

3R—Optical signal regeneration that includes signal retiming as well as signal reshaping as well as regeneration or re-amplification.

4R—Any electronic reconditioning to correct for transmission impairments other than 3R processing, such as, but not limited to, FEC encoding, decoding and re-encoding.

A/D—Add/Drop.

APD—Avalanche Photodiode.

AWG—Arrayed Waveguide Grating.

BER—Bit Error Rate.

CD—Chromatic Dispersion.

CDWM—Cascaded Dielectric Wavelength Multiplexer (Demultiplexer).

CWDM—Coarse Wavelength Division Multiplexing —transmission of data on more than one wavelength in a given direction on a grid of spacing greater than 200 GHz.

DBR—Distributed Bragg Reflector laser.

EDFAs—Erbium Doped Fiber Amplifiers.

DAWN—Digitally Amplified Wavelength Network.

DCE—Dispersion Compensating Elements either for CD, such as DCFs, dispersion managed solitons, frequency guiding filtering, chirped fiber Bragg gratings, or dispersion slope compensation, or for PMD, such as through optical device design to achieve polarization insensitivity or equalization optical circuitry to provide distorted optical signal polarization transformation.

DCF—Dispersion Compensating Fiber.

DEMUX—Demultiplexer.

DFB—Distributed Feedback laser.

DCF—Dispersion Compensating Fiber.

Digital OEO REGEN—an OEO REGEN that provides complete digital handling of channel signals including their regeneration in a digital optical network without deployment or need for analog optical components including optical fiber amplifiers.

DM—Direct Modulation.

DON—Digital Optical Network as defined and disclosed in this application.

DWDM—Dense Wavelength Division Multiplexing—transmission of data on more than one wavelength in a given direction on a grid of spacing less than or equal to 200 GHz.

EDFA—Erbium Doped Fiber Amplifier/

EML—Electro-absorption Modulator/Laser.

EO—Electrical to Optical signal conversion (from the electrical domain into the optical domain).

FEC—Forward Error Correction.

GVD—Group Velocity Dispersion comprising CD and/or PMD.

ITU—International Telecommunication Union.

MMI—Multimode Interference combiner.

Modulated Sources—EMLs or SMLs, combinations of lasers and external modulators or DM lasers.

LR—Long Reach.

MZM—Mach-Zehnder Modulator.

MUX—Multiplexer.

NE—Network Element.

NF—Noise Figure: The ratio of output OSNR to input OSNR.

OADM—Optical Add Drop Multiplexer.

OE—Optical to Electrical signal conversion (from the optical domain into the electrical domain).

OEO—Optical to Electrical to Optical signal conversion (from the optical domain into the electrical domain with electrical signal regeneration and then converted back into optical domain) and also sometimes referred to as SONET regenerators.

OEO REGEN—OEO signal REGEN is OEO conversion wherein the signal is regenerated in the electronic domain between conversions to the optical domain. SONET regenerators are one example of OEO REGEN but it is not limited to such regenerators.

OO—Optical-Optical for signal re-amplification due to attenuation. EDFAs do this in current WDM systems.

OOO—Optical to Optical to Optical signal conversion (receiving in the optical domain, processing in the optical domain, and transmitting in the optical domain, without conversion of the signal to the electrical domain).

OOO-REGEN—OOO signal REGEN using all-optical regeneration.

OSNR—Optical Signal to Noise Ratio.

PIC—Photonic Integrated Circuit.

PIN—p-i-n semiconductor photodiode.

PMD—Polarization Mode Dispersion.

REGEN—optical signal regeneration or regenerator is signal restoration, accomplished electronically or optically or a combination of both, which is required due to both optical signal degradation or distortion primarily occurring during optical signal propagation caused by the nature and quality of the signal itself or due to optical impairments incurred on the optical transport medium.

Rx—Receiver, here in reference to optical channel receivers.

RxPIC—Receiver Photonic Integrated Circuit.

SDH—Synchronous Digital Hierarchy.

SDM—Space Division Multiplexing.

Signal regeneration (regenerating)—Also, may be referred to as signal rejuvenation. This may entail 1R, 2R, 3R or 4R and in a broader sense signal A/D multiplexing, switching, routing, grooming, wavelength conversion as discussed, for example, in the book entitled, "Optical Networks" by Rajiv Ramaswami and Kumar N. Sivarajan, Second Edition, Morgan Kaufmann Publishers, 2002.

SOA—Semiconductor Optical Amplifier.
SONET—Synchronous Optical Network.
SR—Short Reach.
TDM—Time Division Multiplexing.
Tx—Transmitter, here in reference to optical channel transmitters.
TxPIC—Transmitter Photonic Integrated Circuit.
VOA—Variable Optical Attenuator.
VMPD—Velocity-Matched Distributed Photodetector.
WDM—Wavelength Division Multiplexing—transmission of data on more than one wavelength in a given direction.

The landscape of optical transport networks has change significantly over the past ten years. Prior to this time, most long haul telecommunications were generally handled via electrical domain transmission, such as provided through wire cables, which are bandwidth limited. Telecommunication service providers have now since about 1994, or maybe just prior to this time, have commercially deployed optical communication systems or optical transport networks which having vastly higher information or data transmission capability particularly in bandwidth compared to traditional electrical/electronic transport networks. Capacity demands now have increased significantly with the advent of the Internet which has been said to bring about six times, and probably more, as much traffic into a network compared to electrical domain transmission. The demand for information signal capacity increases dramatically every year.

First optical transport networks deployed prior to 1994 were space division multiplexing (SDM) where optical data signals at a single wavelength were each transported in a single fiber. This type of network 10 is shown in FIG. 1. In FIG. 1, the information signal, for example, to be transmitted in the optical domain is received in terminal 12 electronically via linecard 14 and converted to the optical domain for transmission on an optical fiber link, via an optical module 12A by either direct modulation of a discrete semiconductor laser, such as a DFB laser, or by external modulation using an optical modulator, such as a discrete Mach-Zehnder modulator (MZM) receiving light from a discrete, CW operated DFB or DBR laser. Optical module 12 also may include an optical receiver for channel signals propagated in an opposite direction from terminal 16. These discrete optical components are optically aligned at the factory and provided in a package 12A and mounted in association with linecard 14 as a module on a mother board, for example, for insertion into a transmission rack at a facility of the service provider.

The modulated optical signal is then transported on a first optical link 22A generally for a distance of about 60–80 km where the signal has become so deteriorated or degraded in quality(depending, in part, the type of fiber medium in use) that regeneration or REGEN of the optically propagating signal was necessary, e.g., the signal must be converted back into the electrical domain re-amplified, reshaped and/or retimed (2R or 3R) and then reconverted back into the optical domain (OEO) for transmission on the next optical link 22B. Such OEO REGENs 20, as shown along optical span 22 of FIG. 1, included the deployment of an optical modules 23 or 25 to receive (or transmit) the optical signal from terminals 12 or 16. These modules employ discrete, optically coupled optical active and passive components inside packages 23 and 25 and electronic linecards 21 and 24 for conversion of the optical information signal into the electrical domain, performing a 2R or 3R function, and then reconverting or regenerating the electrical domain signal back into the optical domain for continued propagation on the optical span 22. REGENS 20 may also have the capability of signal switching or routing to other networks or to local networks as indicated at 26. This OEO REGEN 20 was required between fiber spans 22B, 22C, 22D and 22E, which spans may typically be about 60 to 80 km in length, until the information signal reached its destination at terminal 16 (or terminal 14 depending on the direction of signal propagation) where the signal was converted into the electrical domain via optical module 16, comprising an optical detection element or component, such as p-i-n photodiode (PIN) or an avalanche photodiode (APD), and the signal was then further processed, such as amplified or reshaped, for example. As indicated, such an optical transport network 10 was generally bilateral in that module 12 also included components of module 16 and visa versa in order that optical information signals can be sent and received in either direction along the fiber link 22. Such networks were capable of transporting a single optical signal, $\lambda_I$ and/or $\lambda_J$, at 2.5 Gb/sec in either direction. However, to implement the network for signal transport, it was necessary to transport those signals respectively on a separate fiber. Thus, there were bundles of fibers each supporting transport of a single modulated optical wavelength signal.

It is interesting to note that the concept of an OEO REGEN, such as illustrated at 20 in FIG. 1, goes back well before their first viable commercial utilization. Examples of types of OEO REGENs can be found in U.S. Pat. Nos. 4,090,067 (issued 1978), 4,688,260 (issued 1987) and 4,948,218 (issued 1990).

FIGS. 3A–3E explains pictorially the 3R function such as provided in OEO REGEN 20. First, a shown in FIG. 3A, clean digital pulses comprising an optical channel signal 11 is transmitted or launched on an optical link. Due to optical nonlinearities and impairments incurred in propagation of the channel signal over the link, which are explained in further detail below, the signal becomes so distorted and degraded, as seen at 13 in FIG. 3B, that OEO REGEN is necessary to restore the integrity of the signal; otherwise, the signal cannot be accurately read or deciphered at the optical receiver. The first step in the 3R process is re-amplification of the distorted signal 11 as shown at 15 in FIG. 3C. The next step, as shown in FIG. 3D, is to reshape the signal as a digital optical channel signal 17. Note, however, that signal pulse is still impaired as indicated at 19 where the inter-pulse timing is incorrect. Thus, in the last step of the 3R process, the signal is retimed, as shown in FIG. 3E as regenerated replica of digital electrical signal 11, which is subsequently converted into an optical signal of like form via an optical modulator in an optical transmitter module.

The capacity of optical transport networks was increased by deploying time division multiplexing (TDM) where lower bit rate information signals are converted into higher bit rate signals for transport as a single optical wavelength. The lower bit rate optical signal is combined with other lower bit rate signals into a higher bit rate signal and transported all as a single wavelength over a single fiber to a receiving terminal or node where the low bit rate signals are separated out of the higher bit rate signal at the receiving terminal.

The capacity of optical signal transport was further materially increased with the advent of wavelength division multiplexing (WDM) commercialized in about 1994 where multiple optical information signals of different wavelengths were optically combined for transport as a multiplexed optical signal on a single fiber. This was a large leap forward because now multiple optical signals could be placed concurrently on a single optical fiber span or link.

Even though WDM brought a large enhancement to digital signal transport, the significantly high cost of OEO REGENS prevented immediate deployment due to the need to rejuvenate the multiplexed signal gain over short optical fiber spans, such as 40 to 60 km. This meant that the multiplexed channel signal had to be demultiplexed into the individual different-wavelength information signals which were converted into the electrical domain, possibly both reshaped and retimed and then regenerated back into the optical domain (OEO). Then, in about 1995, the commercial deployment of erbium doped fiber amplifiers (EDFAs) along the optical transport path became a reality. With advent of EDFAs, optically multiplexed signals could be simultaneously amplified in the optical domain (OO) and optical signal propagation distances were extended with the deployment of EDFAs along the span and between REGEN sites, i.e., the number of required REGEN sites along a given optical span and link could be reduced by providing OO conversion through the deployment of EDFAs in lieu of OEO conversion. Thus, the deployment of EDFAs eliminated the need of closer optical link spacing deploying costly OEO REGENs through the employment of intervening EDFAs 46, which is illustrated in FIG. 2. The advent of EDFAs enabled a new set of optical network economics due to the ability to replace OEO REGENs at a single site with a single EDFA. However, the employment of EDFAs is not completely inexpensive because these fiber amplifiers must be of highest performance with operating characteristics such as good gain flattening characteristics and low noise figure over the operational bandwidth of spectral gain of the multiplexed optical signals.

As shown in FIG. 2, in the EDFA implemented, bilateral optical transport network 30, the point of signal generation may be, for example, from either optical terminal or node 32 or 36 having respective linecards 34 and 38. Also, along the transport path, OEO REGENs 40 are provided for 3R signal regeneration. At terminals 32 and 36, plural optical channel signals are generated from electrical pulse information signals and the multiple optical signals are multiplexed and launched onto an optical fiber span, such as span 41A or 41C. During signal propagation, the multiplexed signals are amplified by a high performance EDFAs 46 located along the optical span 41A, 41B or 41C. Initially there may be about three to five such EDFA sites per span but the number in many cases was soon increased to ten EDFA sites per span. When the multiplexed channel signals reached a REGEN 40, the multiplexed optical signals undergo demultiplexing followed by OE conversion, regeneration, reshaping and retiming (3R) via linecards 42 and 44 in the electrical domain and, then, EO conversion of the 3R generated signals performed in the transceiver modules 43 and 45 is accomplished for launching the optically rejuvenated or regenerated multiplexed channel signals on the next optical fiber span, such as span 41B. Also, these REGEN sites 40 include switching and routing capabilities at 46 so that channel signal can be switched, or routed or received from other nodes or sites for transmission from or into network 30. Multiplexed channel signals arriving at a terminal 32 or 36 undergo demultiplexing at 32A and 36A and OE conversion for electrical signal processing. Thus, each of the optical modules 32A and 36A has both OE and EO components so that optical signals can be transported in either direction of the optical span 41A, 41B and 41C.

The principal achievement of EDFA deployment, as indicated above, was the insertion of bilateral EDFAs 46 along the optical link thereby eliminating the need of closer spaced REGENs and extending the length of the optical transmission up to about 100 km before OEO REGEN becomes a real necessity. Thus, the optical spans 41A, 41B and 41C between OEO REGENs 40 could be extended by including optical amplification (OO) in either direction via EDFAs 46. This greatly enhanced the optical signal capacity.

In all of the different types of optical transport networks 30 having different channel capacity and/or different baud rate, the optical module and OEO REGEN architecture was principally the same, which is exemplified in FIG. 4 illustrating the types of discrete optical components that are found in typical optical modules terminals 32 and 36 and OEO REGENs 40. Within each Tx module 50 and Rx module 60, a plurality of discrete optical components is utilized. While FIG. 4 shows Tx module 50 and Rx module 60 in separate packages, it is known to utilize both of these optical modules in the same package to form an optical transceiver or transponder. Each channel signal is EO generated or EO translated using individual optical components comprising a discrete channel laser and discrete channel modulator. However, the deployment of arrays of optical components is possible, e.g., a DFB laser bar of N laser emitters. But it is difficult to achieve multiple wavelength arrays of DFB lasers in a commercially practical manner because the wavelengths of the individual laser emitters must be of different wavelengths on the standardized wavelength grid, such as the ITU grid, and their individual wavelengths stabilized against changing environmental and other operational conditions. For these reasons, the most reliable architecture to date is to deploy separate discrete tunable DFB laser components. These discrete optical components must be optically coupled to one another, which is highly cost-related since such alignments, as identified at 51 and 61 in FIG. 4, must generally be carried out by hand for each of the optical coupling points.

Tx module 50 includes, for example, a plurality of discrete DFB lasers 52(1) . . . 52(N-1) and 52(N) which have a wavelength stabilization control to maintain their individual operational wavelengths to a standardized wavelength grid. Each of the N DFB lasers 52 is optically coupled via a fiber to the input of an optical modulator 54(1) . . . 54(N-1) and 54(N), which is generally a Mach-Zehnder modulator (MZM). The outputs of each of the N MZMs 54 are then optically coupled via a fiber to the input of MUX 56. Currently, MUX 56 is, in most cases, a silicon-based arrayed waveguide grating (AWG). The output of MUX 56 is then optically coupled usually to some gain medium functioning as a preamplifier 58 to boost the multiplexed signals to higher amplitude due to insertion loss experienced in optical components 54 and 56 as well as optical loss experienced at optical coupling points 51 between these optical components (including optical coupling to DFB lasers 52). The preamplifier is generally a high performance EDFA. In general, the signals are transmitted with 50 nm spacing.

In the configuration of FIG. 4, the multiplexed optical signal channels are launched on optical fiber link 57 which may include a plurality of EDFAs 59 spatially disposed along its length to amplify or provide gain to the multiplexed optical signals, as previously indicated in FIG. 2.

Rx module 60 generally includes a preamplifier 62, which may be an EDFA or can be a SOA. After pre-amplification, the received multiplexed signals are optically coupled via a fiber to the input of MUX 64, which, as mentioned previously relative to Tx module 50, is currently a silicon-based AWG. DEMUX 64 may also additional filters to convert the 50 nm spacing of the signals into 100 nm spacing. The demultiplexed signals are then optically coupled via optical fibers to respective photodetectors 66(1) . . . 66(N-1) and 66(N) for conversion into the electrical domain. The photodetectors generally utilized are of the APD type. The linecard (not shown) then processes these converted signals. Again, there are a number of optical coupling points 61 where fiber connections must be made to optically couple plural optical components to one another.

Reference is made to FIG. 5 which exemplifies the progression of price or cost reduction in optical transport pricing with the advent WDM-transport networks or systems with corresponding increase in channel capacity and drop in cost per channel between about the years of 1994 and 2002. As shown in FIG. 5, the first transport networks carrying a single wavelength with 3R and OEO REGEN, illustrated in FIG. 1, were of high cost in 1994 as indicated at point 70 in FIG. 5. While the concepts and prototypes of WDM networks began to become a reality in 1994, they were not yet commercially practical until the advent of the optical fiber amplifier or EDFAs which significantly extended the network reach as well as capacity. The WDM transport networks were around 1996 with the advent of 2.5 Gb WDM systems at point 71. Between roughly 1995 and 1998 (i.e., between about points 71 and 72 of FIG. 5) and forward, 2.5 Gb WDM systems went from 8 channels to 16 channels to 80 channels. As the WDM systems grew in capacity, the cost of these systems and cost per channel steadily decreased as shown in FIG. 5. Between points 72 and 73 in FIG. 5 or roughly from 1997 and forward, 10 Gb systems came into operation further increasing capacity through increased data rates and correspondingly reducing the cost of the systems and the cost per channel. In this period of time, the 10 Gb systems went from 8 channels to 32 channels to 80 channels to the beginning of 160 channels extending toward point 74 in FIG. 5. At about point 73 or around 2001, the concentration by vendors and service provider customers has been toward extending system reach through the deployment of more and more EDFAs along the optical spans rendering the distance between costly OEO REGEN sites or nodes further and further apart further reducing the cost per channel but not at a rate of cost per channel as initially experienced in the past as seen between points 70 73 as compared to point 74 in FIG. 5.

While the capacity increases were effective in improving the cost-effectiveness of optical transport networks, the networks were able to improve their cost-effectiveness by a larger factor by increasing the network reach. The reach of the network was defined by the maximum distance that the optical fiber amplifier could continue to support an appropriate OSNR for the channel signals. Initially, the distances that service providers were attempting to reach between traffic locations ("routes") were typically much longer than the networks could support. Early networks were capable of reaching distances typically on the order of about 300–500 km. Routes today commonly reach distances exceeding 1000 km. Thus, multiple networks have to be concatenated together to reach other appropriate networks and terminations. Network costs were dominated by the electronic interfaces required at OEO REGEN sites 40 along long-haul routes. Thus, carrier providers were incensed to increase the reach of their networks to minimize the need for OEO REGENs 40. Over time, carrier providers were able to extend the reach of their optical transport networks to thousands of km.

The net effect over time on a typical route of 1000 km or any other extended system reach of a route even in excess of 1000 km, the increase of channel counts and distances has led to the following approximated economics savings relative to a normalized price:

TABLE 1

| Year | Approximated Economic Savings | Optical Network |
| --- | --- | --- |
| 1994 | X | SONET OEO REGEN |
| 1996 | 0.340X | $1^{ST}$ Generation WDM |
| 1998 | 0.170X | $2^{ND}$ Generation WDM |
| 2000 | 0.057X | $3^{RD}$ Generation WDM |
| 2001 | 0.046X | $4^{TH}$ Generation WDM |

Said another way, the cost optical signal transport has fallen by over a factor, for example, over approximately 20 times in about the last seven years. However, along with these gains in deploying WDM systems in optical transport networks has come increasing complexity, together with additional costs, through the need for additional network components, higher performance and new constraints imposed by new and improved network devices, such as those for correcting nonlinearities and analog irregularities. Continued increase in performance comes disproportionately with cost, which results in diminishing price/performance gains.

Thus, since network capacity has been largely addressed through these WDM transport systems carrying increasing larger number of signal channels, service providers no look to achieve economic gains by extending the reach of systems in their optical transport networks. This goal is based upon the premise that channel signal regeneration is costly and expensive. In order to achieve this goal, therefore, one factor is to eliminate OEO REGENS within the extended network reach. As result, there has been recent resurgence to provide an all optical transport network with OOO REGEN to eliminate costly OEO REGEN. This is because OEO REGENS are so much more expensive predominately because of the deployment of discrete optical components and their associated optical coupling point costs as well as 3R signal revamping in the electrical domain and subsequent signal regeneration in the optical domain via optical channel signal demultiplexing and multiplexing to perform full signal revamping. In this connection, many companies and research facilities are working toward the development of an all-optical transport platform that is entirely in the optical domain, thereby eliminating any requirement for costly OEO conversion by its total elimination. A few examples of this work in this area are exemplified in U.S. Pat. No. 6,169,616 (OOO A/D), U.S. Pat. No. 6,335,819 (OOO REGEN), U.S. patent application, Pub. No. US 2002/0015201 A1 (OO spectrum attenuators), published Feb. 7, 2002 and U.S. patent application, Pub. No. US 2002/0030867 A1 (OO switching), published Mar. 14, 2002.

While the strides made toward OOO REGEN and an all-optical transport platform have been impressive, the ultimate achievement of a commercially viable OOO REGEN and an all-optical transport platform is still many years away. Also, such OOO systems contemplate the continued deployment of optical fiber amplifiers (EDFAs) which have a continuing analog drawback of wavelength dependent gain and noise, causing unequal channel performance and, therefore, require a multitude of added optical or opto-electronic devices and components to correct for their analog disparities such as gain flattening and dispersion compensation (DC). As an example, the above mentioned Pub. No. US 2002/0015201 A1 recognizes this problem and provides for signal attenuation for each channel to achieve equalized gain across the signal channel spectrum and likely lower OSNR but at the sacrifice of adding additional costly components to the system and still not eliminating accumulated channel signal imparities enhanced by cascaded analog optical fiber amplification in the transmission path.

Cost analysis of OEO REGEN, as known by those skilled in this area of technology, will reveal that these current optical module packages 50 and 60 a shown in FIG. 4 are the single most highest manufacturing module cost in fabricating an optical transport network, with a leading cost factor in these modules being number of required optical fiber or other such coupling points 51 and 61, which, for example, each have an estimated manufacturing cost of anywhere between about $1,500 and $2,000. Multiplied by the number of such points 51 and 61, this is a major cost in the manufacture of optical modules for use in optical transport networks such as the network illustrated at 30 in FIG. 2.

Provisional application Ser. No. 60/392,494, and its later filed non-provisional patent application, Ser. No. 10/267,212, supra, provides a low cost alternative architectural approach to both current OEO discrete device REGENs and OOO REGENs significantly reducing these high costs and complex and costly optical alternatives in optical module fabrication to provide a more palatable optical Tx or Rx module for OEO REGEN for highly cost-conscience telecommunication service providers. Such a new OEO REGEN site needs to be highly cost effective and a highly price competitive with both exiting OEO REGEN sites as well as OO sites such as the current deployment of EDFA sites along the optical fiber span.

Current WDM networks or systems do not provide any consideration of converting an optical amplifier sites, such as an EDFA site 46 in FIG. 2, to a digital regeneration site. This is because the deployment of current discrete Tx and Rx component architecture is totally unfavorable from an economic standpoint and the digital REGEN sites. REGEN sites, like that shown at 194 in FIG. 16, dramatically reverses this economic situation. Beside the replacement of EDFA sites 46 with REGEN sites 104, an EDFA site may also be maintained in place and provided with a Digital OEO REGEN bypass, which is the subject of this invention.

OBJECTS OF THE INVENTION

It is an object of the present invention to provide a digital OEO bypass for an EDFA or other optical amplifier installed in an optical transport network or system.

SUMMARY OF THE INVENTION

According to this invention, a digital signal channel bypass is provided as bypass around an optical network optical amplifier, in particular, an analog type optical amplifier, such as an EDFA, in an optical transport network or system. The digital signal bypass provides for an ability to maintain the existing optical amplifier OO amplification site while inserting a bypass that provides ultra low-cost OEO REGEN in a digital optical network (DON) utilizing both semiconductor electronic integrated circuit chips and semiconductor photonic integrated circuit (PIC) chips where all the optical components are in semiconductor integrated chip form providing 1R, 2R, 3R or 4R regeneration as well as other signal caring functionality. A salient feature of the digital signal bypass is to regenerate signals in the optical span that are outside the gain bandwidth of the EDFA or other such amplifier.

Current WDM networks or systems do not provide any consideration of converting an optical amplifier sites, such as an EDFA site 46 in FIG. 2, to a digital regeneration site or node. The concept of an OEO bypass to an optical fiber amplifier (OFA) or OO site, let alone a digital 3R REGEN bypass, is not considered in the art because the present trend, at least at this moment in time, is to eliminate, altogether, any OEO site or node and design and develop OOO REGEN sites requiring no conversion of channel signals into the electrical domain. There are examples in the art of OFA bypassing for optical service channel (OSC) functioning and management as well as monitoring OFA performance metrics, such as disclosed in U.S. Pat. No. 5,914,794. However, we are not aware of any digital signal OEO bypass as set forth herein for 3R bypass of an OFA, such as an EDFA site deployed in an optical span of an optical transport network.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a schematic view of a first optical transport network as known in the art.

FIG. 2 is a schematic view of a second optical transport network as known in the art.

FIGS. 3A–3E are graphic illustrations of the effects of nonlinearities and other optical impairments on a transmitted optical channel signal as is known in the art.

FIG. 4 is a schematic view of the details of an optical Tx module and an optical Rx module deployed in the network shown in FIG. 2.

FIG. 5 is a graphic illustration of the variance in costs per signal channel of various deployed optical transport networks over time.

FIGS. 6A–6D is a schematic illustration of the deployment of optical transport networks over approximately the last ten years and how with the instant architecture, the network ends up looking like the original optical transport network but at much reduced manufacturing costs.

FIG. 7 is a schematic illustration of the optical transport network deploying digital OEO REGENS.

FIG. 8 is a schematic illustration of a 3R junction (switching) site

FIG. 9 is a schematic illustration of a 3R A/D site.

FIG. 10 is a schematic illustration of a metro ring network.

FIG. 11 is a schematic illustration of a regional ring network.

FIG. 12 is a schematic illustration of a TxPIC chip.

FIG. 13 is a schematic layout of the TxPIC chip of FIG. 13.

FIG. 14 is a schematic illustration of a RxPIC chip.

FIGS. 15A–15G are a series of illustrations showing different alternative configurations for the TxPIC and RxPIC chips.

FIG. 16 is a schematic illustration of a digital 3R OEO REGEN.

FIG. 16A is a schematic illustration of digital 3R REGEN sites deployed along an optical span.

FIG. 17 is a schematic illustration of a digital OEO REGEN, capable of A/D, switch/route, multiplexing and signal grooming.

FIG. 18 is a more detailed illustrative example of the features pertaining to the architecture of the optical transport network.

FIG. 19 is a schematic illustration of an alternative version of the optical transport network shown in FIG. 7.

FIG. 20 is another embodiment of an architecture of an optical transport network utilizing multiple TxPIC and RxPIC chips.

FIG. 21 is a schematic illustration of a first embodiment of bypassing an optical fiber amplifier site with a digital OEO REGEN site comprising this invention.

FIG. 21A is an example of an optical switch that may be utilized in the embodiment of FIG. 21.

FIG. 22 is schematic illustration of a second embodiment of bypassing an optical fiber amplifier sites with a digital REGEN site comprising this invention.

FIG. 23 is schematic illustration of a third embodiment of bypassing an optical fiber amplifier sites with a digital REGEN site comprising this invention.

FIG. 24 is schematic illustration of a fourth embodiment of bypassing an optical fiber amplifier sites with a digital REGEN site comprising this invention.

DETAILED DESCRIPTION OF THE INVENTION

In order to fully appreciate the application of this invention relative to EDFA bypass, an understanding and explanation of the digital optical network is paramount and its utility as an OEO REGEN in an optical transport network. A "digital optical network" is differentiated from analog optical networks deploying analog type optical components such as EDFAs which provide various analog type of optical impairments (such as, OSNR with added noise figure (NF), GVD, distorted signal shape, signal pulse stream dislocations due to distorted timing, PMD, unequal gain across the signal spectrum or gain tilt) despite the important principal function they performed (signal gain). This terminology, "digital optical network", has, in the past, been employed previously in the optical telecommunications art, although in a limited manner, i.e., referenced in only few times, for example, in the patent literature to refer to optical transport networks using SONET or and the promulgated communication protocols used in such networks. In this sense, this terminology is referencing, in part, digital signal transmission as opposed, for example, to analog signal transmission, such as deployed in the past for full electrical/electronic transport networks. In the instant application, reference to "digital optical network", or DON, means something different, as indicated above. In particular, DON means the correction of all channel signal impairments accumulated during signal propagation through regeneration pf channel signals in their digital form as distinguished from analog amplification through the use of optical amplifiers, such as EDFAs, where analog signal degradation effects are still carried with the transported channel signals. Thus, in this manner, a digital optical network can be defined as one that does not utilize components to compensate for analog kinds of signal impairments such as for dispersion compensation, gain flattening filters and PMD compensation, i.e., it is not constrained by analog network limitations.

In a most generic sense, a digital optical network may be defined as an optical WDM network (or sub-network) wherein the cost of the hardware is significantly lower than that of conventional optical transport networks, such as illustrated in FIGS. 2 and 4, this cost being enabled by an ultra low-cost OEO REGEN deployed throughout the network. This ultra low cost OEO REGEN facilitates: (1) the deployment of an optical transport network with very low first-in cost, (2) a low total capital cost, (3) reduced operating costs, and (4) unique network flexibility and scalability. The digital optical network, by nature of its low-cost OEO conversion, enables the ability to add and drop channels (and hence, switch, route, and groom, channels or sub-channels) at very low cost.

The basic building block or foundation of the digital optical network is the photonic integrated circuit (PIC) for both the optical transmitter and the optical receiver. This device facilitates the incorporation of multiple EO or OE components for handing a plurality of WDM channels on a semiconductor chip. The increased number of components on the chip drastically reduces the number of packages required in an optical network module and, thus, radically reduces the cost structure of the network since these modules are a major contribution of the cost in optical network gear.

Reference is now made to FIG. 7 showing a digital optical network (DON) 100 comprising this invention. Shown in FIG. 7 is a long haul fiber span with terminals 102 on either side of the span and a plurality of digital WDM (OEO) 3R REGENs 104 provided along the span. REGENs 104 are shown in FIG. 16 and have optical transmitter and receiver PIC chip structures of the type shown in FIGS. 12–14 which are to be discussed later. It should be realized that other configurations, other than those illustrated in FIGS. 12–14, may be utilized in the architecture of this invention, which other configurations are illustrated in FIGS. 15a–15G herein as well as in the patent applications incorporated herein by reference. In this connection, reference is also made to these incorporated patent applications which discuss in more detail, the layout, fabrication and operation of TxPICs and RxPICs. In the illustration of FIG. 16, the RxPIC/TxPIC chips are back-to-back to provide for OEO functionality with associated electronic circuitry. As seen in FIG. 16, each digital REGEN 104 is bidirectional and includes, in each direction, i.e., is East and West, at least one RxPIC chip 140 and at least one TxPIC chip 120. The multiplexed optical information signals, propagating from West to East or from East to West, are received on optical link 139 or 141 and coupled into RxPIC 140 where they are demultiplexed and converted into electrical signals. These converted signals are taken off-chip at lines 137 and are 3R processed at electronic circuit 172 and provided to electrical cross connect 174 where they are passed through or re-routed and passed through cross connect 174 to electronic circuits 176 were they may be 1R processed and provided respectively to TxPIC 120 for conversion back into the optical domain and launched on fiber link 139 or 141. 3R REGEN 104 is comparatively small relative current OEO systems since much of the optical circuitry is integrated on semiconductor type of chips.

It should be noted that TxPIC chip 120 and RxPIC chip 140 may be independently deployed without the other in terminal sites, such as initial transmission of optically modulated signal channels from a source origin with TxPIC chip 120 or end reception of optically multiplexed signal channels at a receiver terminal with RxPIC 140.

FIG. 16A is an illustration of an optical span with a plurality of digital OEO REGEN sites 104, one of which is shown in FIG. 7. Digital OEO REGENs 104 are deployed along an optical span at points where propagating channel signals minimally require 1R regeneration but, instead, provide 3R regeneration. REGEN sites 104 can be deployed at points where optical fiber amplifiers, e.g., EDFAs, were previously deployed or are desired to be deployed to re-amplify the propagating channel signals, or can be deployed at digital linear add/drop sites and junction sites as depicted in FIG. 18, to be discussed later. As an example, REGENS 104 are price-competitive with EDFA sites and, in addition, minimally provide the capability of signal re-amplification, re-shaping and retiming, the latter of which are not capable of being accomplished by an EDFA.

In addition to a pass-through OEO REGEN sites 104, the digital optical network can also be deployed as a 3R junction site 106 as illustrated in FIG. 8 or as a 3R A/D site 114 as illustrated in FIG. 9 to such existing sites or, more importantly, as an upgrade to an existing digital OEO REGEN site 104 to add switching or A/D functionality. In this manner, DON is modular in that it can be upgraded to include additional functionality eliminating the need for analog span engineering as is necessary in conventional optical analog systems and sites. As shown in FIG. 8, the junction site 106 includes a set of three OEO REGENs 108 with appropriate line card circuits 110, each similar to the structure of REGEN 104 shown in FIG. 16, and a electrical cross connect 112 for electronically switching the OE converted signals to one of the three appropriate outputs through electronic matrix switching and the signals are EO converted via REGEN 108 and launched onto a fiber link.

In the A/D site 114 in FIG. 9, the OE converted signals at REGENs 108 may be routed to a different optical transport network or network element (NE) 118, which, for example, may be a switch or cross connect. The advantage of the DON architecture of this invention is the provision of a full flexible A/D multiplexer replacing any optical fiber amplifier site at a competitive price with such amplifiers. Moreover, an already installed digital 3R OEO REGEN site 104 can be conveniently upgraded to a digital A/D site 114 to provide any configuration of selective channel add and drop.

FIG. 10 illustrates in simplistic form, a metro network comprising fiber ring 103 with plural digital DON terminals 102. In a conventional metro network, these terminals are analog and engineered to provide for designed traffic requirements. If traffic patterns change, as indicated by dotted lines 105 where traffic demands have changed to direct more channel traffic to the East terminal 102, the East analog terminal must be redesigned and changed to meet the changing traffic needs and increase its capacity. Said another way, such conventional terminals with their discrete channel components are not forecast tolerant. Future traffic demand or changes in traffic patterns are not predictable. So, to meet new or changing traffic demands, the conventional site must be redesigned or re-engineered substantially from the beginning to include additional channels and additional optical channel add/drops to replace or bypass the existing site or node. Each such additional add/drops means additional dB insertion loss. This limits the capacity of network ring 103. Adding additional EDFA sites to metro ring will help increase traffic capacity but this is an expensive approach. However, the deployment of digital terminal sites 102 in accordance with the architecture of this invention eliminates these problems by deploying digital REGEN terminal sites 102 on metro ring 103. In particular, the digital 3R REGEN sites 102 provide flexibility in functionality choices modularity or scalability in increasing channel service capacity without requiring redesign engineering at the site. This is because the modularity capability of adding additional signal channels through the addition of TxPIC/RxPIC chips to the system board. Added functionality can be provided, such as, A/D multiplexing, switching, routing and grooming through the added or replaced circuitry to include the additional function at the site directly to the existing digital 3R OEO REGEN site components. This modularity provides for a "pay as you go" system and eliminates the costly expense of reengineering, from the beginning, a conventional analog site to meet new capacity and/or upgrade in functionality. Also, in metro networks which include EDFA amplification sites cannot be upgraded without replacement of the existing analog OEO regeneration site. The placement of existing and future EDFA sites with digital REGEN sites of this invention permits future upgrade in functionality at those sites without later replacement of existing equipment at the site. This added modularity and upgrade capability is an important feature provided by the digital optical network of this invention.

FIG. 11 is a simplistic form of a regional network which is principally the same as the metro network in FIG. 10 except has a larger distance and capacity ring 107 and the network communication is more mesh-like in nature. As in the case of the metro network of FIG. 10, the regional network employing 3R OEO REGEN sites 102 provides more flexibility in system revamping or upgrading at comparatively much lower costs due to the deployment of transmitter and receiver photonic integrated circuit chips for channel signal reception and regeneration in the optical domain and 3R signal regeneration (re-amplifying, reshaping and retiming) via linecard chip set circuitry in the electrical domain. The upgrade in channel capacity is accomplished by adding additional PIC chip modules to increase the capacity of the network through an increase of the number of channels, such as illustrated by multiple TxPIC and RxPIC chips in the modules shown in FIG. 20, and upgrade in functionality by changing in circuitry such as an upgrade of a terminal site 102 in FIG. 11 to an A/D site 114 shown in FIG. 9.

Reference is now made to the details of one embodiment comprising TxPIC 120 and RxPIC 140 which are respectively shown in FIGS. 12 and 14. As previously indicated, further details concerning the architecture, structure, operation and functionality of these PICs is set forth in provisional applications, Ser. Nos. 60/328,207 and 60/328,332, now nonprovisional patent application, Ser. No. 10/267,331, filed Oct. 8, 2002, also published on May 22, 2003 as Pub. No. US 2003/0095737 A1; 60/370,345, now nonprovisional application, Ser. No. 10/267,330, filed Oct. 8, 2002, also published on May 22, 2003 as Pub. No. US 2003/0095736 A1; and 60/367,595, now nonprovisional patent application, Ser. No. 10/267,304, filed Oct. 8, 2002, also published on Feb. 19, 2004 as Pub. No. US 2004/0033004 A1, all of which are incorporated herein by their reference. With reference first to FIG. 12, TxPIC comprises an InP-based semiconductor chip which includes integrated optical and electro-optic components formed as a monolithic photonic integrated circuit. Chip 120, in the case here, comprises modulated sources of laser 124 and modulators 126. Another type of modulated sources is an array of direct modulated (DM) DFB or DFB lasers. Chip 120 has a plurality of spatially aligned, integrated DFB lasers 124 each having a different operating wavelength approximated or optimized within a standardized wavelength grid, such as the ITU grid. Note that laser 124 may also be DBR lasers. There are twelve such lasers and signal channels in the embodiment shown in FIG. 12. However, there may be, for example, any number of such channels formed on the chip ranging, for example, from 4 to 40 channels depending, for example, on their close spacing within acceptable cross-talk limits. Some of these channels may be redundant channels for use in place of inoperative lasers or modulators or EMLs. These DFB lasers 124 are wavelength stabilized as taught in the above identified provisional and patent applications. Each of the 12 channels in chip 120 also includes an optical modulator 126 to modulate the light output of a respective CW operated DFB laser 124. Chip 120 may also include an optional optical array of PIN photodiodes 122 to monitor the laser power and wavelength output of each DFB laser 124. Also, an optional array of PIN photodiodes 128, respectively following each modulator 126, may be utilized to monitor the power, chirp and extinction ratio of modulator 126. The modulator 126 may be an electro-absorption modulator or a Mach-Zehnder modulator. On the other hand, it should be understood that TxPIC 120 may not include modulators 126 and semiconductor laser sources 124, albeitDFB lasers or DBR lasers, are directly modulated. As indicated before, FIGS. 12–14 are merely illustrative embodiments for TxPIC and RxPIC chips, as other configurations, as noted in the Summary of Invention, may be utilized as well as illustrated in the configurations of FIGS. 15A–15G.

Optical waveguides 129 are formed in the chip in a fan-out arrangement from PINs 128 or modulators 126 to the input slab 132 of an optical combiner 130, which is an arrayed waveguide grating (AWG) comprising input slab or free space region 132, a plurality of grating arms 134 and output slab or free space region 136 as known in the art. AWG 130 combines the modulated signals on waveguides 129 in a multiplexed signal that is provided on one of the output waveguides 138 formed in chip 120 for taking the multiplexed signal off-chip and optical coupling to an aligned optical fiber. The waveguide 138 having the best signal spectrum from AWG 130 is chosen as the output for launching onto a coupling fiber, such as coupling fiber 135 shown in FIG. 13.

FIG. 13 shows additional detail of TxPIC chip 120 of FIG. 12. It should be noted that this TxPIC chip 120 is just one embodiment of many that may be employed in a digital optical network. See, for example, the different embodiments illustrated in U.S. patent applications, Ser. Nos. 10/267,311, 10/267,330 and 10/267,346, also published on May 1, 2003 as Pub. No. US 2003/0081878 A1, the former mentioned two previously incorporated by reference and the last mentioned one incorporated herein by its reference. A particular example is the provision of integrated optical amplifiers on a PIC chip, such as SOAs or GC-SOAs.

To be noted is a twelve-channel chip of this size is fairly small comprising, for example, 3.5 mm by 4.5 mm. The DFB laser sources are set on center-to-center spacing of about 250 µm. Also shown are the DC biasing for PINs 122(1) . . . 122(12), DFB Laser 124(1) . . . 124(12), MODs 126(1) . . . 126(12) and PINs 128(1) . . . 128(12). On-chip heaters 125(1) . . . 125(12), which may strip heaters, for example, in proximity to each DFB laser, and are independently operated to maintain the peak operating wavelength of each laser to the prescribed wavelength of a standardized grid. Also, a heater 131 may be provided to control the wavelength grid of AWG 130 in conjunction with the control of the individual operating wavelengths of DFB lasers 124. This is explained in further detail in the above referenced provisional applications and their corresponding non-provisional applications. Lastly, each of the modulators 126 has a coaxial or coplanar electrode arrangement to provide to each MOD 126 an electrically modulated signal to each modulator 126(1) . . . 126(12) for modulating the light of the DFB lasers 124, i.e., to accomplish EO signal conversion.

Reference is now made to FIG. 14 which shows the typical layout br a RxPIC 140. It should be noted that this RxPIC chip 140 is just one embodiment of many that may be employed in a digital optical network. See, for example, the different embodiments illustrated in U.S. patent applications, Ser. Nos. 10/267,331 and 10/267,304, supra. A particular example is the provision of integrated optical amplifiers on a PIC chip, such as SOAs or GC-SOAs.

RxPIC 140 is an InP-based semiconductor chip that has an input at 145 to receive a multiplex optical signal from an optically coupled fiber link. An optical amplifier 142 may be integrated on the chip to boost the gain of the multiplexed signal prior to demultiplexing. Amplifier 142 may be a SOA or, more preferably, a gain-clamped SOA or optical laser amplifier. Such amplification can alternatively be done off-chip with an optical fiber amplifier at the input of waveguide 145. The multiplexed signal, in any case, is received on chip waveguide 147 and provided as an input to input slab or free space region 146 of AWG 144. AWG 144 comprises input slab 146, an array of grating arms 148 of different lengths and an output slab 150 as known in the art. Output slab 150 has a plurality of outputs in the first order Brillouin zone, one for each demultiplexed channel wavelength signal, which are respectively provided to PIN photodiodes 152(1) . . . 152(12). Again, although there are twelve channels shown here for chip 140, there may be as many as 4 to 40 such channel outputs from AWG 14 with corresponding photodetectors. A higher Brillouin order output channel 154 may also be provided on RxPIC chip 140 to provide a channel light output to PIN photodiode 156 in order to monitor the wavelength, power of the signals or provide for FEC capabilities.

The strategic impact in utilizing integrated optics in the form of the TxPIC and RxPIC chips 120 and 130 utilized in this invention is, by way of an example, is a decrease in cost in dollars per wavelength or channel by approximately 24 to 1 lower than a comparable conventional systems deploying discrete components as discussed earlier herein and also price competitive with conventional network, high performance analog EDFA sites.

Reference is now made to FIG. 15 which shows, in simplistic form, alternative configurations for TxPIC chip 120 and RxPIC chip 140. Portions of these chips can be formed on separate chips. For example, as shown in FIG. 15A, the arrangement shown in FIG. 12 is illustrated except without PINs 122 and 128. Chip 120A contains an array of EMLs or modulated sources 121 and chip 120B contains the optical combiner or AWG 130 and are optically coupled together, such as by butt coupling. Moreover, other types of optical combiners can be utilized in any of these embodiments such as a MMI coupler or an echelle grating. This is the simplest form of TxPIC chip 120A with modulated sources 121 comprising DFB lasers 124 and EAMs 126. In the embodiment of FIG. 15B, the modulator of choice for modulated sources 121 for chip 120A are MZMs 162, which are to modulate the CW output light received from DFB lasers 124. In the embodiment of FIG. 15C, the modulated sources comprise DFB lasers 12, provided on chip 120A, and are direct modulated (DM) lasers which are known in the art. Their outputs are optically coupled to optical combiner 130 on chip 120B. This is the simplest form of a TxPIC chip 120 comprises an array of DFB lasers 124 and an optical combiner 130.

FIG. 15D illustrates the simplest form of a RxPIC chip 140 comprising an optical decombiner 144 on chip 140A and an array of photodetectors 152 formed on chip 140B which may be an array of PIN photodiodes or avalanche photodiodes. Again, chips 140A and 140B may be formed as a single monolithic chip 140 or chip 140B may be optically coupled, such as by butt-coupling, to chip 140B.

In The embodiment of FIG. 15E, separate EML or modulated source chips $120A_1$ and $120A_2$ are provided each with arrays of DFB lasers 124 and modulators 126. Each chip $120A_1$ and $120A_2$ may be optically coupled, such as via optical butt coupling, to optical combiner 130 formed on chip 120B. In the embodiment of FIG. 15F, optical combiner 144 on chip 140A may have its outputs optically butt coupled to two different photodiode chips $140B_1$ and $140B_2$ each having separate arrays of photodiodes 152 for detection of channel signals.

In the embodiment of FIG. 15G, a bidirectional OE REGEN 170 can be formed with four semiconductor chips 120A, 120B, 140A and 140B optical coupled as shown. Alternatively, chips 120A, 120B, 140A and 140B may be form on a single monolithic semiconductor chip 170 or as separate PIC chips 120 and 140 as illustrated in FIGS. 15A and 15D.

Reference is now made to FIG. 17 which illustrates another OEO REGEN configuration 176 of this invention. In this configuration, multiplexed signal channels are received from optical line 139, as an example, by TxPIC/RxPIC chip 140A, demultiplexed and OE converted for signal regeneration and cross-switching at digital regeneration circuits 178. The functions performed on the demultiplexed electrical signals may include 3R, A/D multiplexing, switch or route, multiplexing, such as TDM multiplexing, wavelength conversion or signal grooming as all known in the art. Re-routed signals from TxPIC/RxPIC module 104A may be switched off for transmission on optical lines 177 or 179 from regeneration circuits 178 and EO converted at TxPIC/RxPIC modules 173 and 179, respectively, multiplexed and launched on one or more optical lines 177 and 179. On the other hand, the rejuvenated channel signals may be switched to TxPIC/RxPIC chip(s) 120 and launched on optical line 140. Conversely, channel signals received from optical lines 177 and 179 are demultiplexed and OE converted at TxPIC/RxPIC modules 177 and 179 and regenerated and rerouted by regeneration/cross-switching circuits 178 to either or both of TxPIC/RxPIC modules 104A and 104B for launching on optical lines 139 and 141, respectively.

FIG. 18 illustrates various system components shown in FIGS. 7–9, 16 and 17 in a digitally amplified wavelength network (DAWN) 180 which is one of the main focuses of this invention. On the West side of DAWN 180 is terminal node or site 186 which includes TxPIC and RxPIC chips 120 and 140 and electronic linecards 110 for sending and receiving channel signals relative to optical link 188 and to provide channel signals to tributary interfaces 185 between client devices such as a network element (NE) 184, for example, a switching device, and a routing device 182. The fiber link 188 connects terminal site 186 to an optical fiber amplifier site 190. Site 190 is a standard optical fiber amplifier site for amplifying WDM channel signals propagating bidirectionally in the optical transport network. Site 190 is a high performance amplifier site that performs 2R, i.e., both optically re-amplification and reshaping of the channel signals in either direction on the network. Also, optical dispersion compensation may be performed at this site, e.g., deploying DCF. The fiber link 192 connects the optical amplifier site 190 to a digital 3R site 194 deploying OEO functionality. Site 194 is the same type of site as site 104 in FIG. 7 or the detailed structure shown in FIG. 16. Digital amplifier site 194, therefore, performs electronic signal regeneration, (re-amplification, reshaping and retiming).

The fiber link 196 connects digital 3R site 194 to a digital linear A/D site 198. This site 198 is the same type of site as site 114 in FIG. 9. As indicated by the arrows in this site, a portion of the channel signals are added from or dropped to local tributary interfaces 199 to local devices such as network element (NE) 206 and router 208. The fiber link 205 connects digital linear A/D site 198 to junction node or site 210 located at the junction of multiple transmission fibers from different directions, i.e., from East, West, North and South. This site is the same type of site as site 106 in FIG. 8. The channel signals are groomed individually, or in groups, and then may be generally switched to other optical fiber links, such as indicated by arrow 222, or pass through to tributary interfaces 225 to client devices such as network element (NE) 226 and router 228 and also switched to other optical fiber links as indicated by arrow 224. The other arrows indicate other possible cross-connect paths of channel signals at junction site 210.

In all of the foregoing sites, except, of course, the optical fiber amplifier site 190, the digital DWDM components with the RxPIC and TxPIC chip components 120 and 140, such as shown in FIGS. 12 and 14, which are at the front end of the architecture fabric, are key to the digital architecture not only in terms cost competitiveness but also in terms of providing modularity to the architecture for easy and low cost upgrade of channel capacity.

It should noted that with respect to performance monitoring, the digital optical network of this invention provides for a first time increased accessibility to more points along an optical transport network than previously before in providing the ability to verify the BER on any channel at any point on the span where a low cost DON system is installed. DON provides not only immediate access to the network for upgrading but also provides closer point-to point ability to localize and isolate network errors, particularly error rates. As can be readily understood with reference to FIGS. 6C and 6D again, that DON affords now a low cost replacement of the amplifier sites 82 in FIG. 6C with digital network sites that provide immediate access to the network which can isolate errors between points of DON installations as is illustrated in FIG. 6D. As can be seen form FIG. 6C, there would be many more point along a long haul system to monitor and investigate a point providing particular problems with respect to transmission faults or errors. Thus, a main point then is that the digital optical network of this invention has many more points where the electrical signal and hence the bit error rate is accessible, so that the ability to troubleshoot span and equipment problems is greatly enhanced. Long haul systems maintain the signal in the optical domain for 600 km to 3200 km and hence pinpointing any degradation in signal quality is extremely difficult and has been a severe limitation in gaining acceptable of long haul optical systems. The ability to verify the error rate on any channel at the end of every fiber link or span or even every few spans or links or at previously installed optical amplifier sites is a tremendous advantage in network management to immediately isolate and locate points of system errors and other network faults through shorter distal links along the entire network.

Reference is now made to FIG. 19 which is a modification of the long haul span shown in FIG. 7. FIG. 19 is the same as FIG. 7 except, in addition, low cost EDFAs 230 are placed along the fiber links in the optical span between terminals 102. Since OFO REGENs 104 are deployed in lieu of conventional, discrete component OEO sets and EDFA sites, the boost in gain provided by low cost EDFAs 230 may be provided by low performance fiber amplifiers, i.e., amplifiers that have relaxed optical characteristics or parameters such as spectrum gain flattening, gain tilt, OSNR performance or noise figure, and there is no problematic characteristic of concatenated line amplifier gain spectrum reduction, gain-tilt or gain ripple accommodation. The deployment of low performance, low cost EDFAs permits a "skip one" or higher topography to be accomplished at the expense of a low performance EDFA because the channel signals will be, soon thereafter, 3R regenerated in any case. "Skip one" is a network approach of skipping the placement of one digital OEO REGEN and replacing it with an optical amplifier which may already exist or is newly inserted.

Reference is now made to FIG. 20 and digital optical network 240. Network 240, for simplicity, is illustrated as a unidirectional optical communication link, although the network could be bidirectional with the addition of RxPICs 258 in Tx module 242 and TxPLCs 246 in Rx module 244, such as illustrated in FIGS. 16 and 17. FIG. 20 illustrates an optical transport network comprising a Tx module 242 having a plurality of TxPIC chips 246 comprising TxPIGs 1 through 8, which each can have 4 to 40 channels per PIC. EO signal conversion occurs in each TxPIC 246 through direct modulation of the respective DFB lasers or through modulation of on-chip optical modulators. The multiplexed channel wavelength band outputs from the respective TxPIC chips 246 are passed onto waveguides 247 to wavelength band multiplexer 248 for multiplexing all the channel bands from TxPIC chips 246 into a final multiplexed or WDM channel signal for transport on fiber link 252. In a bidirectional digital optical network, device 248 is a band MUX/DEMUX module (BMDM) to multiplex or demultiplex channel bands to and from optical link 252 as known in the art. The multiplexed signals may, then, numbered in total from 32 to 320 channels, and are boosted in signal gain by post-optical amplifier 250 and launched on fiber link 252.

The multiplexed multi-band signal is then received at RxPIC Module 244 where the multiplexed signal may be initially amplified by pre-optical amplifier 254 and, thereafter, band demultiplexed or de-interleaved or both at 256 into multiplexed channel bands and the bands are then passed via optical waveguides 257 onto the individual respective RxPIC chips 258 comprising RxPICs 1–8, where they are demultiplexed into their individual channel signals for OE conversion for offjchip transfer to electronic processing circuitry. It can be seen that Tx and Rx modules 242 and 244 are compact with the deployment of plural semiconductor PIC chips 246 and 258 in modules 242 and 244.

In the digital optical bypass of this invention, which is illustrated in FIGS. 21–24, the bypassing channels may be dropped, groomed, backhauled, amplified or wavelength translated or converted as required. A first embodiment of such a digital optical bypass in one directional network, such as for East-bound channel traffic, is illustrated in FIG. 21. Along the optical span 289 on either side of EDFA 292 and its coupling fibers 304 there are provided in-line optical switches 290 and 294. These optical switches have switching speeds on the order of 1 to 10 msec and are deployed to move channel traffic around EDFA 292, such as through an OEO REGEN 104 or junction site 106 (FIG. 8), A/D site 114 (FIG. 9) or site 178 (FIG. 17). Switching on this scale, although not totally absent of loss, can be successful in certain types of customer installations especially in the case of IP routers. Microsecond optical switches are available but at higher cost.

As shown in FIG. 21, all the signal channels, $\lambda_1, \lambda_2 \ldots \lambda_N$, are optically switched out by optical switch 290 to bypass line 291, i.e., no signal channels are provided on optical line 304 to EDFA 292. Optical switches 290 and 294, for example, may be comprised of 1×2 optical switches, such as JDS Uniphase SN Series switches, or an electro-optical switch 290 of the type shown in FIG. 21A. Other optical switches that may be deployed are MEMs (mirror actuated) or MOM (prism mechanism) switches, both of which are also manufacture by JDS Uniphase.

In utilizing optical switch 290A, shown in FIG. 21A, as a 1×2 switch, the switching signal is applied to either electrodes 290(1) or electrodes 290(2) and input B is ignored. When the switching signal is applied to electrodes 290(1), the optical connection is made from input A to output C. In the case of the embodiment of FIG. 21, the signal channels, $\lambda_1, \lambda_2 \ldots \lambda_N$, would all be directly supplied to EDFA 292. When the switching signal is applied to electrode 290(2), the optical connection is made from input A to output D. In the case of the embodiment of FIG. 21, the signal channels, $\lambda_1, \lambda_2 \ldots \lambda_N$, would then all be supplied to $\lambda$ band filter 296 via bypass optical line 291. Line 291 may be an optical fiber as well as other such lines in these several embodiments. Band filter 296 is a first stage or coarse demultiplexer of a two stage demultiplexing scheme where the signal channels are filtered into channel bands, for example, $\lambda_1$–$\lambda_4$; $\lambda_5$–$\lambda_8$; $\lambda_{N-8} \ldots \lambda_{N-5}$; and $\lambda_{N-4}$–$\lambda_N$, such as shown in FIG. 21. The signal channel bands are provided to the respective digital OEO REGENS 298(1), 298(2) . . . 298(N–1) and 298(N) for individual channel demultiplexing and channel 3R regeneration, and then are optically recombined into channel bands, $\lambda_1$–$\lambda_4$; $\lambda_5$–$\lambda_8$; $\lambda_{N-8} \ldots \lambda_{N-5}$; and $\lambda_{N-4}$14 $\lambda_N$, and thence multiplexed into a multiplex channel signal at $\lambda$ band filter 300 and passed through optical switch 294, via optical line 302, for launching on optical span 289. Thus, each channel in each channel band is treated separately for regeneration. Also, at the point of REGENs 298 in the bypass, signal ADD/DROP multiplexing, grooming, switching, amplification or routing can also be performed too.

As an example, demultiplexing band filter 296 may be a CDWM filter comprising a cascaded set of dielectric filters that provides a plurality of separate channel bands, $\lambda_1$–$\lambda_4$; $\lambda_5$–$\lambda_8$; $\lambda_{N-8} \ldots \lambda_{N-5}$; and $\lambda_{N-4}$–$\lambda_N$, which bands may be, for example, 15 nm in bandwidth. In the example here, REGENS 298 would have PICs capable of four channel processing. However, the number of channels on TxPICs and RxPICs can be larger, as previously indicated. It should be noted that filters can span the wavelength range from 1400 nm to 1600 nm.

Each of the digital OEO REGENs 298 is comprised of a REGEN site 104 as illustrated and described in connection with FIG. 16. The digital bypass of FIG. 21 provides for an in-service upgrade of an EDFA-based site to a digital REGEN site that is not constrained by the EDFA bandwidth. Thus, it should be readily understood that channel signals not within the gain bandwidth of EDFA 292 can be optical switched through the digital bypass for amplification or regeneration and returned to the link 289 via multiplexing filter 300 and optical switch 294 via bypass line 302, which is one important aspect of this invention. As an example, C and/or L band channel signals can be passed through EDFA 292 and channel signals with wavelengths outside the gain bandwidth of EDFA 292 can be passed through the digital bypass and REGENs 298. In such a case, optical switches 290 and 294 would have to be a wavelength band demultiplexer and multiplexer as illustrated in FIG. 23. This is a salient feature of this digital amplifier upgrade to an existing analog fiber amplifier site. Also, as illustrated at 307 in FIG. 21, the digital bypass is easily scalable so that the carrier service provider can simply add or piggyback additional digital bypasses (indicated at 307) from optical switch 290 to accommodate an increase in signal traffic whether such addition channel signals are inside or outside the gain bandwidth of EDFA 292. Moreover, a digital router, for example, such as shown in FIG. 17 can be added to the digital bypass system, such as at 307.

The respective channel bands are independently processed by one of the digital OEO REGENS 298, performing mux/demux of individual signal bands, 1R, 2R, 3R and 4R functions or ADD/DROP multiplexing, grooming, switching or routing functions, separate from the other channel bands. After processing, the channel bands are multiplexed by the $\lambda$ band filter 300 and returned to link 289 via optical switch 294 for propagation with East bound traffic. Precise timing and switching order of channels may be optimized to reduce traffic loss or transients from EDFA 292 if the EDFA remains in continued use.

It should be understood that EDFA 292 may not, especially in the future, be a fiber amplifier. It may alternative be a semiconductor optical amplifier (SOA) or an array of such SOAs as indicated at 292A in FIG. 21. Therefore, this invention is directed to the digital bypass of all optical amplifiers including the foregoing types of analog optical amplifiers.

Further, SOAs could be deployed in the bypass, if desired, forming a hybrid analog/digital bypass. As an example, SOA(s) 298A may be employed along with digital optical amplifiers 298 for receiving certain wavelength bands from DEMUX 296 for optical amplifier as shown in FIG. 21. Alternatively, their maybe optical switches (not shown) in lines 291 and 302 to bypass the digital optical amplifier bypass to process some of the signal channels or signal channel bands via optical amplification by SOA(S) 298B. In either case, the hybrid bypass of FIG. 21 provides minimally for both analog and digital 1R re-amplification by means of SOA(S) 298A or 298B.

The second embodiment in FIG. 22 is the same as that shown in FIG. 21 except that EDFA 293 provides for bidirectional digital signal regeneration on optical fiber link 289 so that all or some of the channel traffic, whether east bond signal channels, $\lambda_i \ldots \lambda_N$, or west bound signal channels, $\lambda_j \ldots \lambda_M$, can be diverted, via optical switch 290 or 294, respectively, through the optical bypass via line 291 or 302, respectively, to mux/demux 297 or 301, respectively, and the individual signal channels, $\lambda_i \ldots \lambda_N$ or $\lambda_j \ldots \lambda_M$, respectively, provided with 3R functioning or ADD/DROP multiplexing, grooming, switching or routing functioning via respective digital OEO REGENs 299(1), 299(2). . . 299(N-1), 299(N). Thus, the principal of the embodiment of FIG. 22 is bidirectional in the sense that west bound traffic can be treated through the digital bypass in the same manner as the East bound traffic performing signal caring functions as outline above and in connection with the embodiment of FIG. 21.

Reference is now made to a third embodiment shown in FIG. 23 which is illustrates a unidirectional digital OEO REGEN bypass comprising this invention similar to FIG. 21 except, in the case here, signal channel bands, $\lambda_{B1}$, $\lambda_{B2}$, etc. are selectively bypassed at first stage band demultiplexer 303 and re-multiplexed at first stage band multiplexer 316. As in the case of FIG. 21, the embodiment of FIG. 23 may be a bidirectional signal regeneration system as illustrated in FIG. 22. In FIG. 23, first stage band demux 303 filters or demultiplexes the channel wavelength bands, $\lambda_{B1}$ and $\lambda_{B2}$, for example, so that channel band, $\lambda_{B1}$ (signal channels, for example, $\lambda_I \ldots \lambda_n$), is directed via bypass optical line 306 to a second stage demux 308 while channel band, $\lambda_{B2}$ (signal channels, for example, $\lambda_J \ldots \lambda_m$), is directed via coupling fiber 304 for amplification via EDFA 292. At second stage band demux 308, the signal channels, $\lambda_I \ldots \lambda_n$, of channel band, $\lambda_{B1}$, are demultiplexed into individual signal channel bands, $\lambda_1$–$\lambda_4$; $\lambda_5$–$\lambda_8$; $\lambda_{N-8} \ldots \lambda_{N-5}$; and $\lambda_{N-4}$–$\lambda_N$, and are 3R regenerated at digital OEO REGENS 310(1), 310(2), . . . 310(N1) and 310(N), after which the channel bands, $\lambda_1$–$\lambda_4$; $\lambda_5$–$\lambda_8$; $\lambda_{N-8} \ldots \lambda_{N-5}$; and $\lambda_{N-4}$–$\lambda_N$, are multiplexed at second stage multiplexer 312 and provided on optical bypass line 314 and re-multiplexed with signal band, $\lambda_{B2}$, from EDFA 292 at first stage band multiplexer 316 and launched onto fiber link 289. Digital OEO REGENS 310, besides performing 3R functions, may also provide channel ADD/DROP multiplexing, grooming, switching or routing functions. Note that the channel bands, $\lambda_1$–$\lambda_4$; $\lambda_5$–$\lambda_8$; $\lambda_{N-8} \ldots \lambda_{N-5}$; and $\lambda_{N-4}$–$\lambda_N$, are demultiplexed, regenerated and re-multiplexed via the respective RxPIC/TxPIC chips in the respective REGENS 310.

Reference is now made to the fourth embodiment shown in FIG. 24 illustrating the deployment of interleavers 320 and 332 in place of first stage band demultiplexers 303 and 316 of FIG. 23. In FIG. 24, the signal channels, $\lambda_1$, $\lambda_2$, . . . $\lambda_N$, are de-interleaved by deinterleaver 320 into even and odd wavelength signal bands, $\lambda_2$, $\lambda_4$, . . . $\lambda_{EVEN}$ and $\lambda_1$, $\lambda_3$, . . . $\lambda_{ODD}$, for example. Even signal channels are provided via fiber 304 to EDFA 292 for amplification and odd signal channels, $\lambda_1$, $\lambda_3$, . . . $\lambda_{ODD}$, are provided to band demux 324 via optical line 322 where the signal channels are demultiplexed into separate channel bands, $\lambda_1$–$\lambda_7$; $\lambda_9$–$\lambda_{15}$; $\lambda_{N-14}$ . . . $\lambda_{N-8}$; and $\lambda_{N-6}$–$\lambda_N$, and provided to respective digital OEO REGENs 326(1) . . . 326(N) for 3R functioning, and then recombined at band mux 328 and the multiplexed optical signal is provided to interleaver 332 via optical line 330 where the recombined odd signal channels, $\lambda_1$, $\lambda_3$, . . . $\lambda_{ODD}$, are then recombined with even signal channels, $\lambda_2$, $\lambda_4$, . . . $\lambda_{EVEN}$, and launched onto optical link 289. As in the case of previous embodiments, the digital OEO REGENS 326, besides performing 3R functions, may also provide channel ADD/DROP multiplexing, grooming, switching or routing functions. Also, the embodiment of FIG. 24 may be a bidirectional optical transport system as in the case of FIG. 22 but is shown here as a unilateral system for purposes of simplicity of understanding.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A digital optical network bypass for a pre-existing in-line optical amplifier in an optical span of an optical transport network comprising:

an digital optical regenerator bypass that provides a bypass for a first WDM signal on the optical span intentionaly destined for processing by the pre-existing in-line optical amplifier and where all channel signals in the WDM signal bypassing the pre-existing in-line optical amplifier in the optical span are to be regenerated;

the digital optical regenerator bypass comprising:

a first optical switch at an input span side of the pre-existing in-line optical amplifier that provides for bypass of the first WDM signal from the optical span to the digital regenerator optical bypass;

a monolithic receiver photonic integrated (RxPIC) chip that has a decombiner with an input to receive the bypassed first WDM signal and demultiplexes the first WDM signal into a plurality of first wavelength channel signals on a plurality of waveguide outputs from the decombiner and a plurallity of photodetectors that receive a respective waveguide output and together provide outputs of a pluralilty of first electrical channel signals;

an electronic channel signal regenerator that receives the first electircal channel signals and regenerates them into second electrical channel signals;

a monolithic transmitter photonic integrated (TxPIC) that has a plurality of modulated sources to convert the second electrical channel signals into second wavelength channel signals on a plurality of waveguide outputs from the modulated sources and a combiner that receives the second wavelength channel signals and multiplexes them into a second WDM signal provided on an output from the first combiner; and a second optical switch at an output span side of the pre-existing in-line optical amplifier that receives the second WDM signal from the combiner output and rejoins the second WDM signal onto the optical span on an output span side of the pre-existing in-line optical amplifier.

2. The digital optical network bypass of claim 1 wherein said pre-existing in-line optical amlifier is an optical fiber amplifier or semiconductor optical amplifier or arrays of such optical amplifiers.

3. The digital optical network bypass of claim 1 wherein the bypass further comprises at least one semiconductor optical amplifier as an additional bypass in parallel with the digital optical regenerator bypass and is in parallel with and in addition to the pre-existing in-line optical amplifier.

4. The digital optical network bypass of claim 1 wherein the bypass further includes an optical analog amplifier as an additional bypass optical amplifier in parallel with the digital optical regenerator bypass and is in parallel with and in addition to the pre-existing in-line optical amplifier.

5. The digital optical nework bypass of claim 4 wherein said optical amplifier is a plurality semiconductor optical amplifiers.

6. The digital optical network bypass of claim 1 wherein the channel signals within the WDM signal that bypass the pre-existing in-line optical amplifier are channel signals that not within the gain bandwidth of the pre-existing in-line optical amplifier.

7. The digital optical network bypass of claim 1 wherein the pre-existing in-line optical amplifier is an optical fiber amplifier or a semiconductor optical amplifier or arrays of such amplifiers.

8. The digital optical network bypass of claim 1 wherein the optical switches are, respectively, a decombiner or a deinterleaver, and a combiner or interleaver.

9. The digital optical nerwork bypass of claim 1 wherein the optical switches are 1×N switches.

10. The digital optical network bypass of claim 1 wherein the bypass channel signals that bypass the optical amplifier are signal channel bands.

11. The digital optical network bypass of claim 10 wherein the decombiner and the combiner are respectively a band demultiplexer and a band multiplexer.

12. The digital optical network bypass of claim 1 wherein the bypass channel signals that bypass the pre-existing in-line optical amplifier are either even or odd numbered channel signals.

13. The digital optical network bypass of claim 12 wherein the decombiner and the combiner are respectively a deinterleaver and an interleaver.

14. A digital optical nertwork bypass for providing a first WDM multiplexed signal comprising a first channel band comprising a plurality of second channel signal bands and destined to be amplified by a pre-existing in-line optical amplifier in a network optical medium of an optical tresnport network, comprising:

an optical-electrical bypass for the first channel band that includes:

a first demultiplexer that redirects the first channel signal band from the optical medium from an upstream side of the pre-existing optical amplifier to bypass that pre-existing optical amplifier;

a second demultiplexer that receives the redirected first channel signal band and that separates the first channel signal band into a plurality of second channel signal bands;

a plurality of optical-electical-optical (OEO) regenerators each comprising a monolithic multi-channel semiconductor receiver photonic integrated circuit (RxPIC) chip, electrical signal 3R signal regenerator, and a monolithic multi-channel semiconductor transmitter photonic integrated circuit (TxPIC) chip;

each of OEO regenerators receiving a respective second channel signal band and having a third demultiplexer that demultiplexes the second channel signal bands into individual optical channel signals, converts the optical channel signals into electrical channel signals and converts the electrical channel signals after electrical signal regeneration into new optical channel signals, and a first multiplexer that recombines the new optical channel signals into a respective third signal bands;

a second multiplexer that receives the third channel signal bands from the OEO regenerators and combines the third channel signal bands into a fourth channel signal band comprising a second WDM multiplexed signal; and a third multiplexer that receives the second WDM multiplexed signal and recombines the second WDM multiplexed signal onto the optical medium from a downstream side of the pre-existing optical amplifier.

15. The digital optical network bypass of claim 14 wherein the first channel signal band is a group of sequential channel signals that approximate a standardized grid of signal wavelengths.

16. The digital optical network bypass of claim 15 wherein the second channel signal bands are groups of channels signals where adjacent such channels signal groups sequentially portend other such channel signal groups.

17. The digital optical network bypass of claim 14 wherein the first demultiplexer functions as a deinterleaver selecting every other channel signal in the WDM multiplexed singal to form the first channel signal band.

18. The digital optical network bypass of claim 17 wherein the first channel signal band is odd or even numbered channel signals in the WDM multiplexed signal.

19. The digital optical network bypass of claim 14 wherein the first channel signal band is not within the gain bandwidth of the pre-existing optical amplifier.

20. The digital optical network bypass of claim 14 wherein the digital optical network bypass includes an optical amplifier for at least one of the second channel signal bands to bypass the OEO regenerators in addition to bypass of the pre-existing optical amplifier.

21. The digital optical network bypass of claim 14 wherein the digital optical network bypass includes an optical amplifier for at least some of the channel signals in the first channel band to bypass the OEO regenerators in addition to bypass of the pre-existing optical amplifier.

22. The digital optical network bypass of claim 14 wherein the digital optical network bypass includes an optical router for at least some of the channel signals in the first channel band to bypass the OEO regenerators in addition to bypass of the pre-existing optical amplifier.

23. A method of implementing an optical signal bypass of a pre-existing in-line optical amplifier in an optical span of an optical transport network, comprising the steps of;

switching from the optical span, upstream of the pre-existing in-line amplifier, a first WDM signal destined for processing by the pre-existing in-line analog optical amplifier;

utilizing a semiconductor receiver photonic integrated circuit (RxPIC) chip to dimultiplex the first WDM signal into a plurality of first channel signals and for converting all of the channel signals into corresponding first electrical signals;

regenerating the first electrical signals into second electrical signals;

utilizing a semiconductor transmitter photonic integrated circuit (TxPIC) chip for coverting the second electrical signals into second channel signals and combining the second channel signals into a second WDM signal; and switching into the optical stream, downstream of the pre-existing in-line optical amplifier the second WDM signal.

24. The method of claim 23 wherein in the step of regenerating, the second signals have been amplifier re-shaped and retimed.

* * * * *